United States Patent
Niewiadomski

(10) Patent No.: US 11,079,245 B1
(45) Date of Patent: Aug. 3, 2021

(54) TECHNIQUES FOR ROUTE PLANNING OPTIMIZATION

(71) Applicant: Amazon Technologies, Inc., Seattle, WA (US)

(72) Inventor: Robert Niewiadomski, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 287 days.

(21) Appl. No.: 16/051,066

(22) Filed: Jul. 31, 2018

(51) Int. Cl.
*G01C 21/34* (2006.01)

(52) U.S. Cl.
CPC ..... *G01C 21/3446* (2013.01); *G01C 21/3492* (2013.01)

(58) Field of Classification Search
CPC .......... G01C 21/3446; G01C 21/3492
See application file for complete search history.

(56) References Cited

U.S. PATENT DOCUMENTS

| | | | | |
|---|---|---|---|---|
| 2009/0319172 A1* | 12/2009 | Almeida | ........... | G06Q 30/02 701/533 |
| 2011/0113155 A1* | 5/2011 | Kuznetsov | ......... | G01C 21/3446 709/241 |
| 2012/0283948 A1* | 11/2012 | Demiryurek | ....... | G01C 21/3492 701/533 |
| 2014/0129141 A1* | 5/2014 | Nesbitt | .............. | G01C 21/3453 701/533 |
| 2015/0160020 A1* | 6/2015 | van Hemert | ............. | A61B 5/18 701/532 |
| 2017/0323249 A1* | 11/2017 | Khasis | ............... | G01C 21/3469 |

* cited by examiner

*Primary Examiner* — Hunter B Lonsberry
*Assistant Examiner* — Matthew J. Reda
(74) *Attorney, Agent, or Firm* — Kilpatrick Townsend & Stockton LLP

(57) ABSTRACT

System and methods are provided for utilizing abstract navigation graphs for route planning purposes. An abstract navigation graph may be generated from a commercially provided navigation graph. One or more maneuver edges may be provided within the abstract navigation graph. Historical location data associated with one or more route traversals may be utilized to identify traversal times for each edge. The traversal times for each edge may be analyzed to identify traversal times for each maneuver edge of the abstract navigation graph. Accordingly, the abstract navigation graph may be utilized for route planning purposes where the traversal times for the maneuver edges impose a time penalty for performing a maneuver. In this manner, maneuver edges of the abstract navigation graph may provide improvements over conventional navigation planning techniques by more accurately representing traversal times than conventional navigation graphs.

20 Claims, 9 Drawing Sheets

TECHNIQUES FOR ROUTE PLANNING OPTIMIZATION

BACKGROUND

Route planning may be utilized in a number of contexts. For example, vehicle navigation systems, delivery systems, and/or inventory management systems may utilize various techniques to determine a lowest cost route of travel for a device (e.g., a vehicle, a mobile drive unit, etc.) to perform a task and/or reach a destination. Conventional techniques may employ navigation graphs that model the topology of the traversal network (e.g., roads, lanes, etc.). These graphs (also referred to as "road-network graphs") may be utilized to represent road segments as edges of the graph. Each edge of the graph may be associated with various attributes that indicate various properties of the segment (e.g., name of the road, address range, posted speed-limit, surface material, grade, street signs/lights, speed limit, or any suitable attribute of the segment). A fundamental limitation of conventional road-network graphs lies in the inability to model transit-time causality effects. In particular, the amount of time required to travel along a given road segment of a potential route may be affected by the preceding and subsequent road segments of the potential route. Traditionally, navigation graphs utilize a single transit time for each edge that doesn't vary based on the route taken. Thus, computations conducted for route planning may result in inaccurate results with respect to route optimality. Embodiments of the invention address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
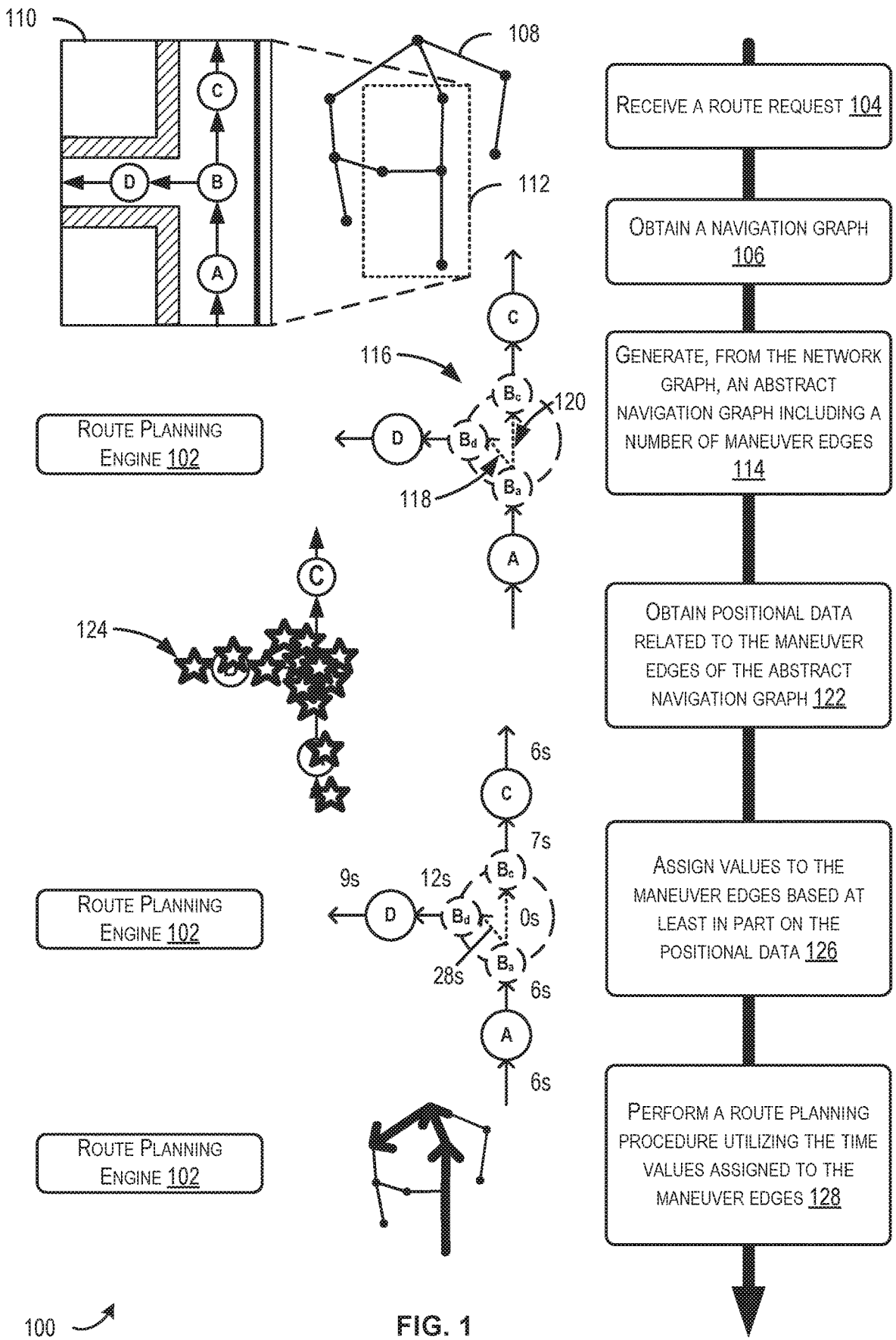
FIG. 1 illustrates a flow for perform route planning procedures utilizing a route planning engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. A "vehicle" as used herein, may include any suitable device for transporting goods and/or people, such as a car, truck, cart, etc, that includes one or more components for route/route planning. As used herein, a "mobile drive unit," is intended to be an example of a vehicle. In some embodiments, a "mobile drive unit" may be a robotic device that may be configured to transport one or more goods/objects. A "route" (otherwise referred to as a "path") is intended to refer to a sequence of edge traversals through a navigation graph (or through an abstract navigation graph) from a source location (or a location within some threshold distance of the source location) to a destination location (or a location within some threshold distance of the destination location).

As described above, a "navigation graph" (also referred to as "road-network graphs") may be utilized to represent road segments as edges of the graph. Each edge of the graph may be associated with various attributes that indicate various properties of the segment (e.g., name of the road, allowed traversal direction(s) (such as northbound, one-way, bi-directional), address range(s), speed-limit(s), surface material(s), road grade, street signs/lights, or any suitable attribute of the segment). In some embodiments, nodes of the graph may be associated with attributes that indicate properties related to the node (e.g., name(s) of roads connected by the node, street signs/lights, surface material, intersection information such as allowed traversals between edges connected by the nodes, etc.) Various nodes may connect these edges of the navigation graph. An "abstract navigation graph" may include at least some of the nodes and edges of a navigation graph, but may include additional features (e.g., a greater number of nodes, one or more maneuver edges, etc.). A "maneuver edge," as used herein, is intended to refer to an edge of an abstract navigation graph that is associated with a number of attributes. One attribute of a maneuver edge may quantify a travel time for the maneuver edge. In some embodiments, the maneuver edge may be associated with any suitable number of travel times, where each travel time may correspond to particular day(s) and/or time(s).

Techniques described herein are directed to optimizing route planning utilizing an abstract navigation graph. By way of example, a route request identifying a source location and a destination location may be received by a route planning engine. The route request may be initiated by an electronic device (e.g., a smartphone, a component of a vehicle, etc.). The route planning engine (e.g., operating at a server computer and/or operating, at least in part, at the initiating electronic device) may obtain a navigation graph (e.g., a commercially available road-network graph) that includes a set of nodes and a set of edges. In some embodiments, the navigation graph may be previously obtained from a commercial navigation graph provider.

The route planning engine may utilize the obtained navigation graph to generate an abstract navigation graph. For example, the abstract navigation graph may be generated to include the nodes and edges of the original navigation graph as well as a number of "maneuver edges." In some embodiments, the abstract navigation graph may include a maneuver edge between each original pair of connected edges of the original navigation graph.

The route planning engine may be configured to compute travel times for each maneuver edge based on historical location data. Location data may include Global Positioning Data (GPS) coordinates and/or times associated with past traversals of a given edge. Using the historical location data, the route planning engine may determine speed profiles for past route traversals. By way of example, a first route traversal may include approaching an intersection and turning left, while a second route traversal may include approaching the same intersection and proceeding through the intersection. Two sets of location data may be identified from the historical location data, where the first set includes the historical location data pertaining to the first route traversal, and the second set includes the historical location data pertaining to the second route traversal. The route planning engine may determine a speed profile for each route, where the respective speed profile identifies a speed for each edge.

Given the determined speed for each edge, the route planning engine may determine a traversal time for each edge of the original navigation graph in light of each speed profile. The traversal times determined from this process may be utilized to identify a penalty and/or a traversal time that seemingly corresponds to a maneuver edge. By way of example, the first set of location data may indicate longer traversal times seemingly due to the act of turning left, while the second set of location data may indicate shorter traversal times seemingly due to the vehicle proceeding through the intersection. The route planning engine may assign travel times to each edge of the abstract navigation graph according to the speeds identified by the speed profiles. The route planning engine may also assign traversal times to one or more maneuver edges to quantify a time for traversing a maneuver (e.g., turning left, proceeding ahead). As a non-limiting example, a maneuver edge associated with turning left may be assigned a traversal time of 25 seconds, while a maneuver edge associated with proceeding through the intersection may be assigned a traversal time of 0 seconds.

The route planning engine may be configured to utilize the abstract navigation graph including the injected maneuver edges and their corresponding traversal times to determine a route from the source location to the source destination. The route may be determined utilizing any suitable route-planning algorithm. These route-planning algorithms may be configured to generate a number of potential routes and select an optimal route. In some embodiments, an optimal route may be determined to be a lowest-cost route, where the lowest-cost is determined based at least in part on any suitable number of criteria. By way of example a route-planning algorithm may be configured to determine that the lowest-cost route is one that provides the fastest traversal time. It should be appreciated that other attributes of a potential route may be utilized to determine a lowest-cost route such as any suitable combination of: expected elevation changes, expected traversal risk (e.g., risk of vehicle damage and/or damage to transported goods, risk of theft, etc.), type of transported goods, expected traversal distance, expected expended energy, and the like. Through utilization of the abstract navigation graph, the route planning engine may utilize the expected traversal times associated with the maneuver edges of a particular route. By utilizing these expected traversal times, the route planning engine can more accurately determine an optimal route (e.g., a lowest-cost route) than previous techniques that utilized the original navigation graph alone.

Over time, as more historical location data is obtained, the route planning engine may update the traversal times for any given edge and/or maneuver edge to provide more accurate traversal time estimations. In some embodiments, the route planning engine may maintain multiple traversal time associations for any given maneuver edge based on time of day, day, time of year, and the like. In still further embodiments, the route planning engine may determine speed profiles for a given route based at least in part on historical location data that relates to the route request by at least one attribute such as time of day, date, time of year, or the like.

In some embodiments, as part of generating and/or updating the abstract navigation graph, the route planning engine may be configured to replace some edges from the original navigation graph with one or more maneuver edges to be used for route planning purposes. By way of example, the navigation graph obtained by the route planning engine may include any suitable number of edges (e.g., 3, 5, 6, etc.) which describe a particular maneuver (e.g., a U-turn route, a left/right turn through an intersection, etc.). In some embodiments, the route planning engine may be configured to identify that the original edges relate to a single maneuver. A maneuver edge (or more than one maneuver edge) may be generated and inserted into the abstract navigation graph such that it replaces the related edges of the original navigation graph. The route planning engine may then conduct a similar process as described above for identifying a traversal time for the maneuver edge. In this manner, the abstract navigation graph may reduce its computational burden by identifying traversal times for a smaller number of edges (e.g., a single maneuver edge versus five original edges of the navigation graph).

Embodiment discussed herein may provide numerous benefits over conventional route planning techniques. For example, while current navigation systems/route planning systems may utilize navigation graphs, these graphs do not identify delays experienced when maneuvering from one edge to another. Thus, the routes (routes) identified by such systems may include inaccurate travel time estimates which can lead to inappropriate route selections. That is, because these routes do not factor in maneuver times (or other attributes associated with a maneuver), a selected route may in fact not be the optimal route (e.g., the route that results in shortest travel time, the route that includes the least risk, etc.). Accordingly, the route planning engine described herein provides numerous improvements over traditional route planning techniques.

FIG. 1 illustrates a flow 100 for perform route planning procedures utilizing a route planning engine 102, in accordance with at least one embodiment. At 104, the route planning engine 102 may receive a route request. In some embodiments, this route request may be initiated by a computing device (e.g., a computing component of a vehicle (e.g., a car, a mobile drive unit, etc.), a user device (e.g., a smartphone, a laptop, etc.), etc.). In some embodiments, the route request may identify a source location and a destination location with which a route is to be determined.

At 106, a navigation graph (e.g., navigation graph 108) may be obtained. The navigation graph 108 may be an example of a commercially available navigation graph provided by a navigation graph provider. The navigation graph 108 may include any suitable number of nodes and edges which represent a traversal network (e.g., a road-network). The edges of the navigation graph 108 may correspond to traversal segments (e.g., roads) and the nodes of the navigation graph 108 may connect the edges of the navigation graph 108. Diagram 110 may be considered a more detailed view of a portion 112 of the navigation graph 108. The diagram 110 may depict, in this example, a number of edges that are connected by nodes A, B, C, and D in the manner depicted in diagram 110. For ease of explanation, the edges of the diagram 110 may be considered to be traversable in one direction as depicted by the arrows included in the diagram 110. It should be appreciated that, in some embodiments, the edges may be bi-directional.

At 114, an abstract navigation graph including a number of maneuver edges may be generated from the navigation graph 108. A portion 116 of the abstract navigation graph corresponding to the portion 112 of the navigation graph is depicted for illustrative purposes. The portion 112 of the abstract navigation graph may include maneuver edges 118 and 120. Although edges, nodes, and maneuver edges are pictorially presented herein, it should be appreciated that these components of a navigation graph and/or abstract navigation graph may be represented via objects, mapping, entries in a databases, or utilizing any suitable mechanism for representing electronic data and/or associations between electronic data. In some embodiments, the portion 116 of the abstract navigation graph may include a greater number of nodes than the portion 112 of the navigation graph 108. By way of example, node B of the navigation graph 108 may be replaced with nodes $B_a$, $B_c$, and $B_d$. These nodes ($B_a$, $B_c$, and $B_d$) may connect nodes A, D, and C with the maneuver edges 118 and 120 in the manner depicted.

At 122, positional data (e.g., GPS coordinates and/or times corresponding to current and/or historical graph traversals) may be obtained. This positional data (e.g., an instance of which is depicted by positional data 124) may relate to the maneuver edges of the abstract navigation graph. By way of example, the positional data (e.g., a positional data set) depicted in FIG. 1 (including the positional data 124) may relate to the maneuver edge 118 as such data provides information regarding route traversals in which a route was traversed from node A to node D through node B of the navigation graph 108. Although not depicted, additional positional data sets may exist for route traversals from node A to node C through node B of the navigation graph 108. In some embodiments, the route planning engine 102 may be configured to sort obtained positional data into positional data sets corresponding to particular route traversals.

At 126, the route planning engine 102 may be configured to assign values to the maneuver edges (e.g., the maneuver edges 118 and/or 120) based at least in part on the positional data (including the positional data 124). Although discussed in more detail below, the route planning engine 102 may identify traversal times for the edge $A$-$B_a$, $B_a$-$B_d$, and/or $B_d$-D. In some embodiments, the traversal time for the edge $B_a$-$B_d$ (e.g., maneuver edge 118) may quantify a traversal time (e.g., a penalty of 28 seconds) for conducting a maneuver associated with the maneuver edge 118. As a non-limiting example the traversal time (28 seconds) for the maneuver edge 118 may quantify a delay associated with making a left-hand turn from edge A-B of the navigation graph 108 to edge B-D of the navigation graph 108. Similarly, based on positional data associated with traversals from node A to C through node B, a traversal time (e.g., a penalty of 0 seconds) may be associated with the maneuver edge 120.

At 128, once values (e.g., traversal times) have been assigned to the maneuver edges 118 and 120, the route planning engine 102 (or another route planning system) may be configured to perform a route planning procedure utilizing the values assigned to the maneuver edges 118 and 120. As a non-limiting example, the route planning procedure performed by the route planning engine 102 may utilize the abstract navigation graph including the maneuver edges 118 and 120 and their corresponding values to identify an optimal route from a source location to a destination location. Thus, in some examples, the route planning engine 102 may determine that traversing through maneuver edge 120 may result in a lower-cost route (e.g., a faster overall traversal time) than a route which traverses through maneuver edge 118. In some embodiments, the route planning engine 102 may determine a route (e.g., an optimal route) that traverses through maneuver edge 120 and may provide that route to the route requester (e.g., a user device, a computing device of a vehicle, etc.) for further processing.

Figure 2:
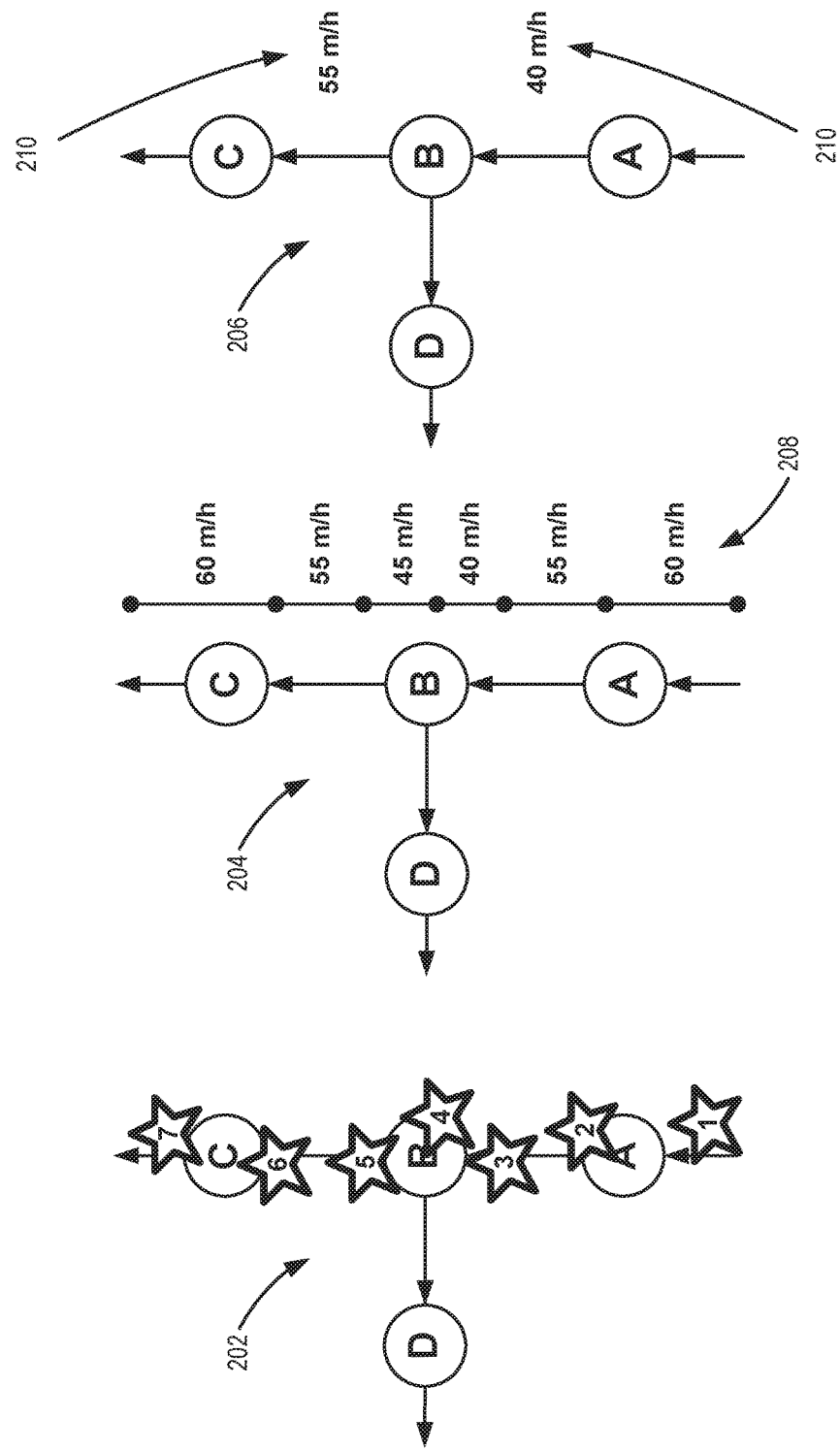
FIG. 2 is a schematic diagram illustrating an exemplary method for determining speeds related to a number of edges of a navigation graph, in accordance with at least one embodiment.

FIG. 2 is a schematic diagram 200 illustrating an exemplary method for determining speeds related to a number of edges of a navigation graph (e.g., the navigation graph 108 of FIG. 1), in accordance with at least one embodiment. Graph portions 202, 204, and 206 are each intended to depict to the portion 112 of the navigation graph 108 of FIG. 1.

As part of a method for determining the speeds for a number of edges of a navigation graph (e.g., speeds for edges from node A to node C through node B), a positional data set including positional data 1-7 may be determined/obtained. Each instance of the positional data 1-7 may correspond to location information such as, but not limited to GPS coordinates and/or times associated with a previous route traversal from node A to node C through node B. The positional data 1-7 may be provided by any suitable computing device (e.g., a cellphone, a component of a vehicle, etc.) during or subsequent to performing the route traversal. The route planning engine 102 of FIG. 1 may be configured to obtain and/or receive positional data 1-7 at any suitable time. In some embodiments, the route planning engine 102 may identify the positional data set including positional data 1-7 from any suitable number of instances of positional data. That is to say, the route planning engine 102 may identify a positional data set that includes only positional data for route traversals from node A to node C through node B from any suitable number of instances of positional data, some of which may relate to a different route traversal (e.g., route traversals corresponding to a route from node A to node D through node B).

Although the example provided in FIG. 2 utilizes unidirectional edges, it should be appreciated that similar techniques may be employed to identify speeds for bi-directional edges. Thus, it may be the case that the route planning engine 102 may identify a positional data set that includes only positional data for route traversals that traverse nodes A, C, and B in a particular direction. Said another way, the positional data utilized for FIG. 2 may only include traversals that traverse from node A to node C through node B and not positional data for traversals of from node C to node A, through node B. The route planning engine 102 may thus use direction as another means for filtering out positional data that does not correspond to the direction to be traversed.

In some embodiments, the route planning engine 102 may be configured to identify traversal speeds from the positional data set including positional data 1-7. As a simplistic example, the route planning engine 102 may utilize positional data 1 and positional data 2 to calculate a traversal speed (e.g., 60 miles per hour (m/h)) of the traversing computing device for traversing from a location associated with positional data 1 to a location associated with positional data 2. It should be appreciated that miles per hour is used for illustration and that any suitable unit of speed may be utilized. In a similar manner, the route planning engine may utilize positional data 2 and positional data 3 to calculate a speed (e.g., 55 m/h) of the traversing computing device for traversing from a location associated with positional data 2 to a location associated with positional data 3. Positional data 3 and positional data 4 may be utilized to calculate a traversal speed (e.g., 40 m/h) between the corresponding locations of positional data 3 and positional data 4. Positional data 4 and positional data 5 may be utilized to calculate a speed (e.g., 45 m/h) for traversing between the corresponding locations of positional data 4 and positional data 5. Positional data 5 and positional data 6 may be utilized to calculate a speed (e.g., 55 m/h) for traversing between the corresponding locations of positional data 5 and positional data 6. Positional data 6 and positional data 7 may be utilized to calculate a speed (e.g., 60 m/h) for traversing between the corresponding locations of positional data 6 and positional data 7. It should be appreciated that in some embodiments, a map-matching algorithm may be executed on the positional data set including positional data 1-7 to obtain velocity vectors (e.g., speeds 208 with corresponding directions) for each portion of the graph corresponding to a distance between sequential positional data instances. In some embodiments, any suitable number of speed profiles corresponding to any suitable number of positional data sets that correspond to route traversals from node A to node C through node B may be calculated.

The speeds 210 (e.g., a speed profile identifying speeds for edges of a particular route) may be computed from the speeds 208 (or any suitable number of speeds computed from any suitable number of positional data sets). In at least one embodiment, a weighted-average function (or another suitable function) may be utilized with the speeds 208 (and/or any suitable number of speeds computed from any suitable number of positional data sets) in order to calculate speeds associated with each edge of the graph portion 206. The speeds 210 may be associated with the edges A-B and B-C as depicted. The speeds 210 may be referred to herein as a "speed profile" as intended to refer to a set of speed measurements determined utilizing the method described herein in connection to FIG. 2.

Figure 3:
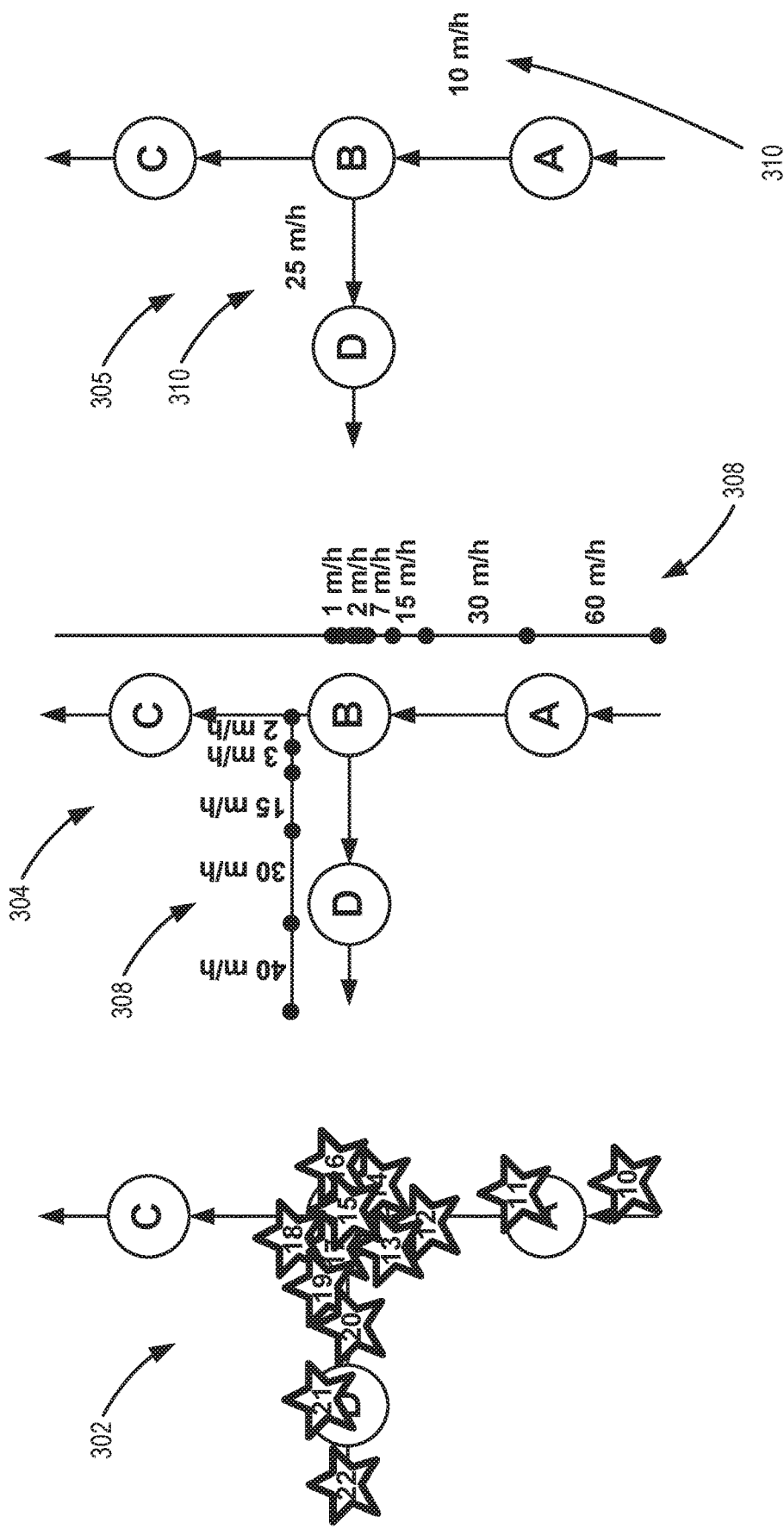
FIG. 3 is a schematic diagram illustrating another exemplary method for determining speeds related to a number of edges of a navigation graph, in accordance with at least one embodiment.

FIG. 3 is a schematic diagram 300 illustrating another exemplary method for determining speeds related to a number of edges of a navigation graph (e.g., the navigation graph 108 of FIG. 1), in accordance with at least one embodiment. Graph portions 302, 304, and 306 are each intended to depict to the portion 112 of the navigation graph 108 of FIG. 1.

As part of a method for determining the speeds for a number of edges of a navigation graph (e.g., speeds for edges from node A to node D through node B), a positional data set including positional data 10-22 may be determined/obtained. Each instance of the positional data 10-22 may correspond to location information such as, but not limited to GPS coordinates and/or times associated with a previous route traversal from node A to node D through node B. The positional data 10-22 may be provided by any suitable computing device (e.g., a cellphone, a component of a vehicle, etc.) during or subsequent to performing the route traversal. The route planning engine 102 of FIG. 1 may be configured to obtain and/or receive positional data 10-22 at any suitable time. In some embodiments, the route planning engine 102 may identify the positional data set including positional data 10-22 from any suitable number of instances of positional data. That is to say, the route planning engine 102 may identify a positional data set that includes only positional data for route traversals from node A to node D through node B from any suitable number of instances of positional data, some of which may relate to a different route traversal (e.g., route traversals corresponding to a route from node A to node D through node B).

Although the example provided in FIG. 3 utilizes unidirectional edges, it should be appreciated that similar techniques may be employed to identify speeds for bi-directional edges. Thus, it may be the case that the route planning engine 102 may identify a positional data set that includes only positional data for route traversals that traverse nodes A, B, and D in a particular direction. Said another way, the positional data utilized for FIG. 3 may only include traversals that traverse from node A to node C through node B and not positional data for traversals of from node C to node A, through node B. The route planning engine 102 may thus use direction as another means for filtering out positional data that does not correspond to the direction to be traversed.

In some embodiments, the route planning engine 102 may be configured to identify traversal speeds from the positional data set including positional data 10-22. As a simplistic example, the route planning engine 102 may utilize positional data 10 and positional data 11 to calculate a traversal speed (e.g., 60 miles per hour (m/h)) of the traversing computing device for traversing from a location associated with positional data 10 to a location associated with positional data 11. It should be appreciated that miles per hour is used for illustration and that any suitable unit of speed may be utilized. In a similar manner, the route planning engine 102 may utilize positional data 11 and positional data 12 to calculate a speed (e.g., 30 m/h) of the traversing computing device for traversing from a location associated with positional data 11 to a location associated with positional data 12. Positional data 12 and positional data 13 may be utilized to calculate a traversal speed (e.g., 15 m/h) between the corresponding locations of positional data 12 and positional data 13. Positional data 13 and positional data 14 may be utilized to calculate a speed (e.g., 7 m/h) for traversing between the corresponding locations of positional data 13 and positional data 14. Each pair of sequential positional data instances may be utilized to calculate speeds 308 for traversing between corresponding locations of the positional data instances. It should be appreciated that in some embodiments, a map-matching algorithm may be executed on the positional data set including positional data 10-22 to obtain velocity vectors (e.g., speeds 308 with corresponding directions) for each portion of the graph corresponding to a distance between sequential positional data instances.

The speeds 310 (e.g., a speed profile identifying speeds for edges of a particular route) may be computed from the speeds 308 (or any suitable number of speeds computed from any suitable number of positional data sets). In at least one embodiment, a weighted-average function (or another suitable function) may be utilized with the speeds 308 (and/or any suitable number of speeds computed from any suitable number of positional data sets) in order to calculate speeds associated with each edge of the graph portion 306. The speeds 310 may be associated with the edges A-B and B-D as depicted. The speeds 310 may be referred to herein as a "speed profile" as intended to refer to a set of speed measurements determined utilizing the method described herein in connection to FIG. 3.

Figure 4:
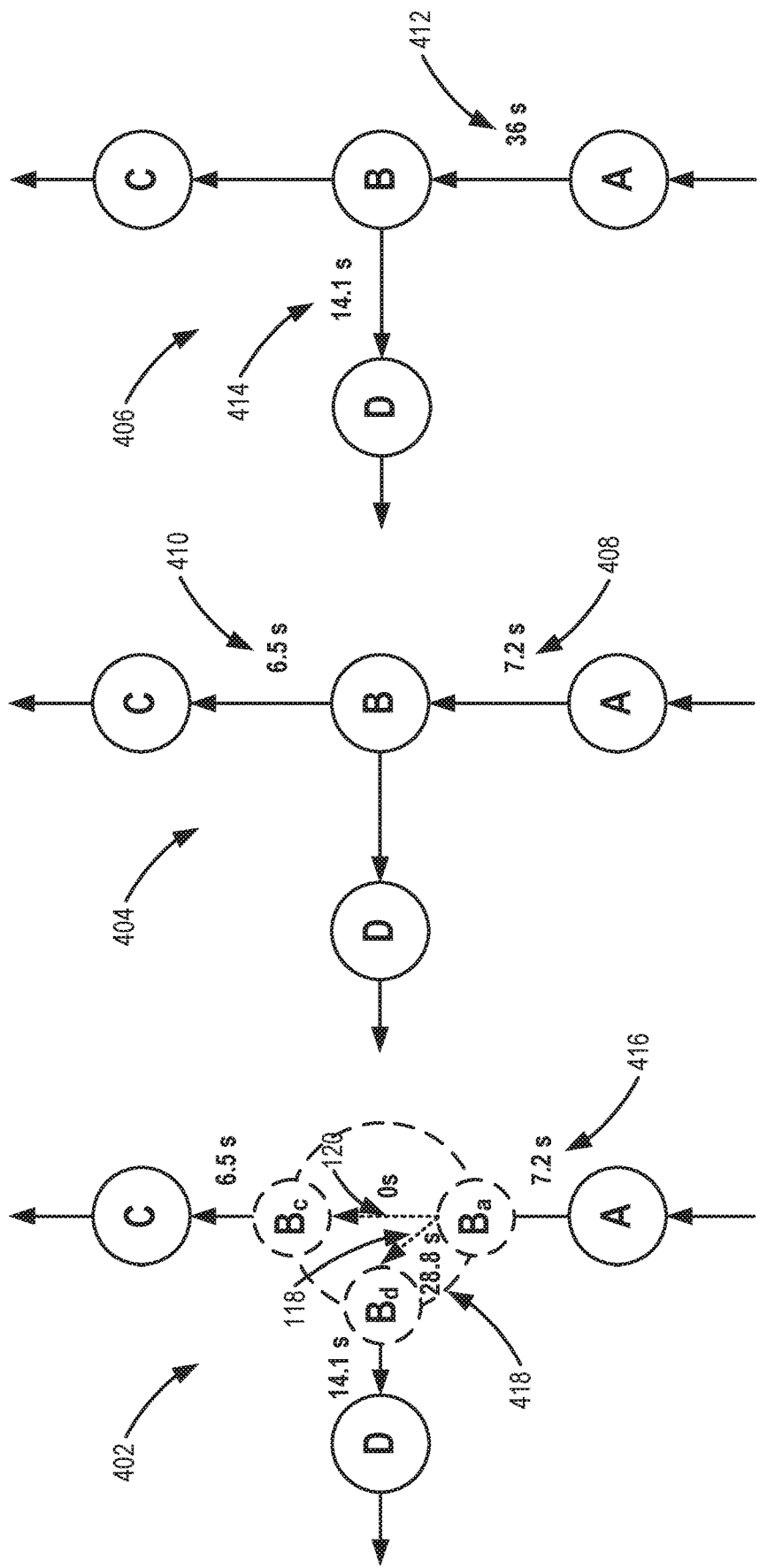
FIG. 4 is a schematic diagram illustrating an exemplary method for determining time values corresponding to a number of maneuver edges of an abstract navigation graph, in accordance with at least one embodiment.

FIG. 4 is a schematic diagram 400 illustrating an exemplary method for determining time values corresponding to a number of maneuver edges of an abstract navigation graph, in accordance with at least one embodiment. Graph portion 402 is intended to correspond to portion 112 of the navigation graph 108 of FIG. 1. As described above, an abstract navigation graph may be generated from a navigation graph (e.g., the navigation graph 108). The navigation graph 108 of FIG. 1 may be an example of a commercially available navigation graph provided by a navigation graph provider. The navigation graph 108 may include any suitable number of nodes and edges which represent a traversal network (e.g., a road-network). The edges of the navigation graph 108 may correspond to traversal segments (e.g., roads) and the nodes of the navigation graph 108 may connect the edges of the navigation graph 108. In some embodiments, the edges of the navigation graph 108 may be unidirectional or bi-directional. An abstract navigation graph may be generated (e.g., by the route planning engine 102 of FIG. 1) to include number of maneuver edges in addition to at least some of the edges and nodes of the navigation graph 108. The graph portion 402 may illustrate a portion of an abstract navigation graph generated from the navigation graph 108 and corresponding to the portion 112 of the navigation graph 108.

In the example depicted in FIG. 4, the graph portion 402 may include nodes A, C, D, $B_a$, $B_c$, and $B_d$. In some embodiments, edge $B_c$-C may correspond to edge B-C of the navigation graph 108, edge $B_d$-D may correspond to the edge B-D of navigation graph 108, and edge A-$B_a$ may correspond to the edge A-B of the navigation graph 108. As part of the abstract navigation graph generation process, the route planning engine 102 may be configured to generate and include maneuver edges $B_a$-$B_d$ and $B_a$-$B_c$ within the abstract navigation graph as depicted in FIG. 4 within graph portion 402. The graph portion 402 of the abstract navigation graph may include the maneuver edges 118 and 120 of FIG. 1. Although edges, nodes, and maneuver edges are pictorially presented herein, it should be appreciated that these components of a navigation graph and/or abstract navigation graph may be represented via objects, mapping, entries in a databases, or utilizing any suitable mechanism for representing electronic data and/or associations between electronic data. In some embodiments, the graph portion 402 of the abstract navigation graph may include a greater number of nodes than the portion 112 of the navigation graph 108 of FIG. 1. By way of example, node B of the navigation graph 108 may be replaced with nodes $B_a$, $B_c$, and $B_d$. These nodes ($B_a$, $B_c$, and $B_d$) may connect node nodes A, C, and D utilizing the maneuver edges 118 and 120 in the manner depicted within graph portion 402.

Although the example of FIG. 4 depicts utilizing unidirectional maneuver edges (e.g., the maneuver edges 118 and 120) it should be appreciated that in some embodiments, a maneuver edge may be bi-directional. If bi-directional, it may be the case that the maneuver edge includes a traversal time for each direction of travel. These traversal times may be defined using multiple attributes associated with the maneuver edge. In some embodiments, the maneuver edges may be unidirectional, and multiple maneuver edges may be utilized, one for each direction of travel.

Graph portions 404 and 406 are intended to be examples of the portion 112 of the navigation graph 108 of FIG. 1. The route planning engine 102 may be configured to calculate traversal times 408 and 410. In at least one example, traversal times 408 and 410 may be calculated based at least in part on a speed profile. For example, the speed profile utilized to calculate traversal times 408 and 410 may include the speeds 210 of FIG. 2. As described above, speeds 210 may have been identified utilizing positional data that relates to the direction of travel associated with the maneuver edge (e.g., traversals from node A, to node B, to node C). As a non-limiting example, given a speed of 40 m/h between node A and node B, the route planning engine 102 may determine traversal time 408 equals 7.2 seconds. Seconds is used for purposes of illustration. It should be appreciated that any unit of time may be utilized. Similarly, given a speed of 55 m/h between node B and node C (as indicated from the speeds 210 of FIG. 2), the route planning engine 102 may determine traversal time 410 equals 6.5 seconds.

In a similar manner, the route planning engine 102 may calculate traversal times 412 and 414. In at least one example, traversal times 412 and 414 may be calculated based at least in part on a speed profile. For example, the speed profile utilized to calculate traversal times 412 and 414 may include the speeds 310 of FIG. 2. As described above, speeds 310 may have been identified utilizing positional data that relates to the direction of travel associated with the maneuver edge (e.g., traversals from node A, to node B, to node D). As a non-limiting example, given a speed of 10 m/h between node A and node B, the route planning engine 102 may determine traversal time 412 equals 36 seconds. In some examples, the calculated 36 seconds may include a delay experienced from maneuvering from the edge A-B to the edge B-D. Similarly, given a speed of 25 m/h between node B and node C (as indicated from the speeds 310 of FIG. 3), the route planning engine 102 may determine traversal time 414 equals 14.1 seconds.

In some embodiments, the maneuver edges 118 and 120 may be defaulted with traversal times of zero seconds. In examples in which conflicting traversal times are calculated for a common edge (e.g., 7.2 s and 36 s for traversing the edge A-B), the route planning engine 102 may be configured to reconcile such traversal times (e.g., traversal times 408 and 412). As a non-limiting example, the route planning engine 102 may determine a shortest traversal time between traversal times 408 and 412 (e.g., 7.2 seconds) and assign the traversal time to edge A-$B_a$ at 416. The route planning engine 102 may determine a difference value (e.g., 28.8 seconds) between the shortest traversal time (e.g., 7.2 seconds) and the longest traversal time (e.g., 36 seconds). In some embodiments, the route planning engine 102 may assigned the difference value (e.g., 28.8) to the maneuver edge 118 at 418. Since traversal time 410 and traversal time 414 do not conflict with any other traversal times, traversal time 410 (e.g., 6.5 seconds) may be assigned to the edge $B_c$-C and the traversal time 414 (e.g., 14.1 seconds) may be assigned to the edge $B_d$-D within the abstract navigation graph.

The process described above in connection with FIG. 4 may be repeated any suitable number of times in order to assign each edge and each maneuver edge of the abstract navigation graph a traversal time. In some embodiments, a maneuver edge may be associated with a traversal time of 0 seconds so long as speed profiles associated with various route traversals of an edge do not conflict over a threshold amount.

Said another way, the reconciliation process described above in connection with FIG. 4 may assign each edge of the abstract navigation graph a minimum traversal time value identified from all calculated traversal time values for the edge, where the calculated traversal time values for the edge were calculated from each respective input speed profile.

Each input speed profile may include any suitable number of speed values corresponding to any suitable number of edges of the navigation graph 108 of FIG. 1. The reconciliation process (e.g., performed by the route planning engine 102) may then assign a traversal time value to a maneuver edge (e.g., the maneuver edge 118) that accounts for a difference measurement between the minimum traversal time value and the other traversal time value (e.g., traversal time 416). In some embodiments, the difference measurement may be calculated to be a difference between the minimum traversal time value and an average of two or more other traversal time values. Thus, any suitable number of input speed profiles (including any suitable number of speed values for any suitable number of edges of a traversed route) may be utilized from which the minimum traversal time value may be identified and the difference measurement may be calculated.

Figure 5:
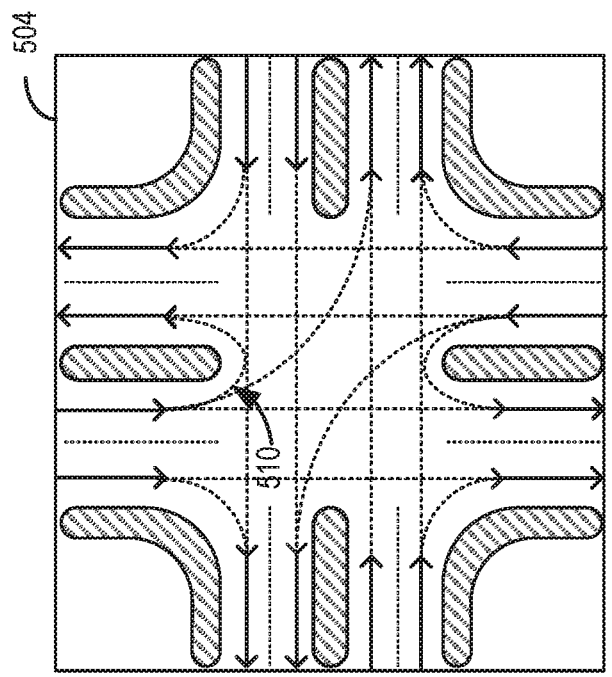
FIG. 5 is a schematic diagram illustrating techniques for generating a number of maneuver edges of an abstract navigation graph based at least in part on a number of segments of a navigation graph, in accordance with at least one embodiment.
Figure 5:
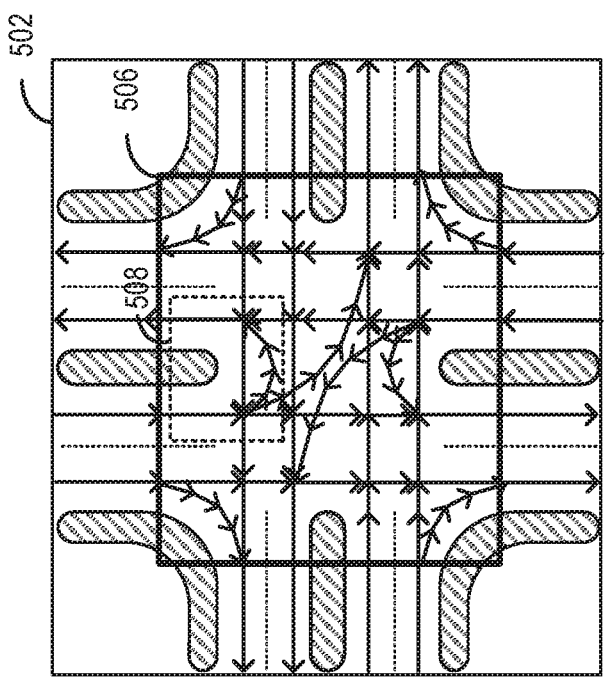

FIG. 5 is a schematic diagram 500 illustrating techniques for generating a number of maneuver edges of an abstract navigation graph based at least in part on a number of edges of a navigation graph (e.g., the navigation graph 108 of FIG. 1), in accordance with at least one embodiment. The techniques described in connection with FIG. 5 may be performed by the route planning engine 102 of FIG. 1 as part of an abstract navigation graph generation process. Graph portion 502 is intended to depict a portion of the navigation graph 108, while graph portion 504 is intended to depict a corresponding portion of an abstract navigation graph generated from the navigation graph 108.

In some embodiments, the route planning engine 102 may identify area 506 as having one or more edges (e.g., edges 508) which may be replaceable with a maneuver edge (e.g., the maneuver edge 510). The identification of area 506 may occur in various ways.

In at least some embodiments, the navigation graph 108 provided by a commercial map provider may include one or more attributes associated with one or more nodes and/or one or more edges of area 506 that indicate various relationships. As a non-limiting example, area 506 may be identified within the map and/or related sets of edges may be identified by the route planning engine 102. In some embodiments, the route planning engine 102 may identify the edges (and/or nodes not depicted) of the graph portion 502 of the navigation graph 108 as being related by at least one attribute. For example, a set of edges (and/or nodes) could be related by road name, by an identified stop light and/or stop sign, or by any suitable attribute associated with the edges and/or nodes within area 506.

As another example, a set of edges could be identified as being related based on an analysis of historical location data. That is, the route planning engine 102 may identify, based on previously received location data (e.g., GPS data with time indexes) that one or more devices have sequentially traversed a particular set of edges within the area 506. As a non-limiting example, the route planning engine 102 may identify that the edges 508 are related based on identifying that one or more devices (e.g., vehicles, mobile drive units, cellphones) have previously followed the route provided by the edges 508 (e.g., a U-turn). In some embodiments, the route planning engine 102 may determine that the route provided by the edges 508 have been traversed over a threshold number of times before it determines that the edges 508 are to be related.

As yet another example, additional data such as images and/or videos of a physical area corresponding to the area 506 may be obtained by the route planning engine 102. For example, the route planning engine 102 may be configured to receive and/or obtain traffic video. Utilizing any suitable image recognition techniques, the route planning engine 102 may identify various route traversals through the area 506. The route planning engine 102 may map the image locations depicting traffic movement to particular sets of the edges of the area 506.

Upon identifying various sets of related edges (e.g., the edges 508), the route planning engine 102 may be configured to replace each set of related edges with a maneuver edge. While the navigation graph 108 may remain unaltered, the set of related edges may be replaced with a corresponding maneuver edge within the abstract navigation graph. For example, upon determining that the edges 508 of the graph portion 502 of the navigation graph 108 are related, the route planning engine 102 may be configured to generate a maneuver edge 510 and replace and/or insert the maneuver edge 510 within graph portion 504 of the abstract navigation graph in lieu of the edges 508. Each maneuver edge depicted with the graph portion 504 may be similar identified from the edges of area 506 within the navigation graph 108, utilizing any suitable process such as the processes discussed above.

By replacing edges that relate (e.g., due to a particular maneuver such as proceed straight through an intersection, left turn, right turn, U-turn, etc.) the route planning engine 102 can reduce the computation burden of identifying speed profiles and related traversal times of the many edges within area 506. Instead, a single maneuver edge may be utilized for each set of related edges. Once these maneuver edges (e.g., the maneuver edge 510) are generated, the route planning engine 102 may identify traversal times for each edge based at least in part on the methods discussed above, particularly those discussed with respect to FIGS. 2-4. Subsequent route planning and selection procedures may then utilize the abstract navigation graph including the maneuver edge 510 rather than the navigation graph 108 including the edges 508.

Additionally, or alternatively, the route planning engine 102, utilizing any of the techniques described above in connection with FIG. 5, may supplement attributes, labels, or any suitable data of the navigation graph as provided by the commercial map provider. By way of example, through image recognition techniques and/or analysis of positional data, the route planning engine 102 can ascertain that the edges with area 506 correspond to an intersection. Street signs, stop signs, traffic lights, or any suitable attribute of the edge/node can be identified by analyzing the positional data indicating traversals through the intersection and/or the corresponding traversal times associated with the maneuver edges (e.g., the maneuver edge 510). By way of example, although the commercial map provider may not include an annotation that identifies area 506 as having a traffic light, through the analysis conducted for identifying the maneuver edges of area 506 and/or calculating the traversal time for said maneuver edges, the route planning engine 102 may determine (e.g., based a predetermined rules set) that the traversal route and/or the traversal time(s) may indicate a traffic light. Additionally, or alternatively, the route planning engine 102 may identify, utilizing image processing techniques, that an image/video of the intersection includes a traffic light. Accordingly, the route planning engine 102 may supplement the commercial map provider's annotations by including an annotation, attribute, association, or the like indicating that the edges of area 506 are associated with a traffic light. This is merely one example, it should be appreciated that any suitable attribute(s) of an edge and/or node of the abstract navigation graph may be identified using similar techniques.

Figure 6:
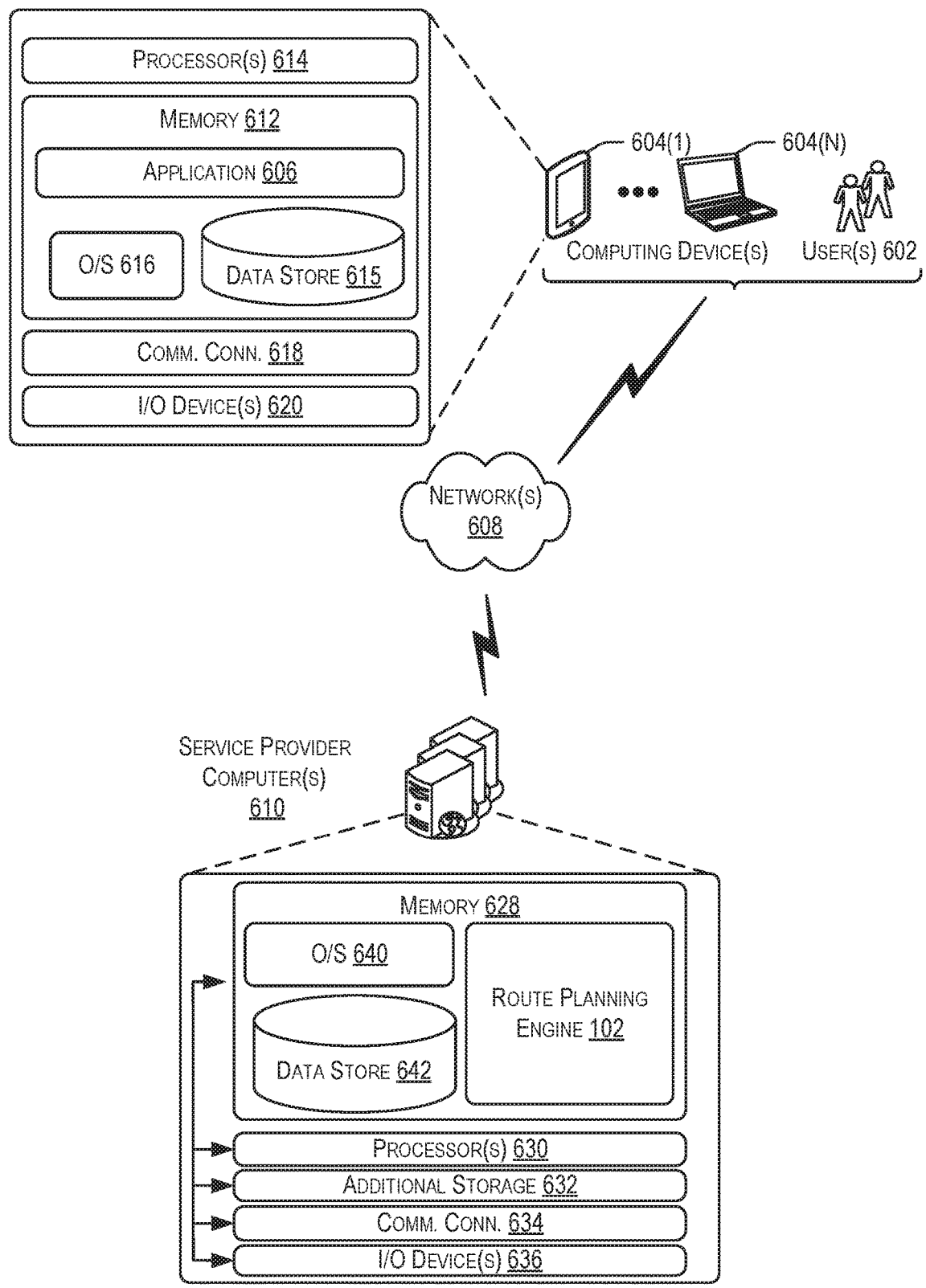
FIG. 6 illustrates components of a route planning system according to a particular embodiment.

FIG. 6 illustrates components of a route planning system 600 according to a particular embodiment. In route planning system 600, one or more user(s) 602 may utilize a computing device 604(1)-(N) (e.g., a smartphone, a tablet, a laptop, a desktop computer, etc.) to request a route (route) and receive route planning information (e.g., a suggested route from a source location to a destination location). It some embodiments, the computing device(s) 604 may be component of a vehicle (e.g., a car, a truck, a mobile drive unit, etc.) and the request for route planning may be initiated by the computing device independent of user interaction. For example, the computing device(s) 604 may be configured to receive a task assignment (e.g., from a task assignment system not depicted) identifying a task associated with a source location and a destination location). The route planning engine 102 may, in some embodiments, be a component of a task assignment system. In situations in which the route request is initiated by the user, the user may access a user interface accessible through an application 606 (e.g., a mapping application, a navigation application, a web browser, etc.) running on the computing device(s) 604 via one or more network(s) 608. In some embodiments, the computing device(s) 604 may access functionality of the route planning engine 102 via the application 606 and/or through various application programming interfaces (APIs) defining data exchanges between the computing device(s) 604 and the service provider computer(s) 610 and/or the route planning engine 102. In some aspects, the application 606 operating on the computing device(s) 604, and/or the APIs, may be hosted, managed, and/or provided by a computing resources service or service provider, such as by utilizing one or more service provider computer(s) 610.

In some examples, the network(s) 608 may include any one or a combination of many different types of networks, such as cable networks, the Internet, wireless networks, cellular networks, and other private and/or public networks. While the illustrated example represents the user(s) 602 accessing application functionality over the network(s) 608, the described techniques may equally apply in instances where the user(s) 602 interact with the service provider computer(s) 610 via the one or more computing device(s) 604 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the route planning engine 102, discussed further below in more detail, may operate in whole or in part on the computing device(s) 604. Thus, in some embodiments, the user(s) 602 and/or the computing device(s) 604 may access the functionality of the route planning engine 102 through components of the computing device(s) 604 (and/or the application 606) and/or the service provider computer(s) 610 via user interfaces and/or APIs provided by the route planning engine 102.

In some embodiments, the application 606 and/or APIs may allow the computing device(s) 604 to interact with the service provider computer(s) 610 so as to provide the various functionality described above with respect to the route planning engine 102. For example, a user (and/or the computing device itself) may request a route from a source location to a destination location. In at least one example, the application 606 may provide a network page and/or user interfaces with which the user(s) 602 may select and/or input a source location and/or destination location, or otherwise provide any suitable information pertaining to requesting a route. In some embodiments, the application 606 (or another component of the computing device) may provide a source location and/or destination location based at least in part on a task assignment received from a task assignment system). The application 606 (or another component of the computing device) may be configured to transmit (electronically convey via a predefined API) the route request to the route planning engine 102, operating at the computing device(s) 604 and/or the service provider computer(s) 610. The application 606 may further be configured to receive, process, and/or display any suitable data received from the service provider computer(s) 610 (e.g., a suggested route, an optimal route, etc.).

The service provider computer(s) 610, perhaps arranged in a cluster of servers or as a server farm, may host the application 606 operating on the computing device(s) 604 and/or cloud-based software services. Other server architectures may also be used to host the application 606 and/or cloud-based software services. The application 606 operating on the computing device(s) 604 may be capable of handling requests from the user(s) 602 and serving, in response, various user interfaces that can be rendered at the computing device(s) 604. The application 606 operating on the computing device(s) 604 can present any suitable type of website that supports user interaction, including navigation websites and the like. The described techniques can similarly be implemented outside of the application 606, such as with other applications running on the computing device(s) 604.

The computing device(s) 604 may be any suitable type of computing device such as, but not limited to, a vehicle (e.g., a car, a truck, a train, a mobile drive unit, etc.), a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the computing device(s) 604 may be in communication with the service provider computer(s) 610 via the network(s) 608, or via other network connections.

In one illustrative configuration, the computing device(s) 604 may include at least one memory 612 and one or more processing units (or processor(s)) 614. The processor(s) 614 may be implemented as appropriate in hardware, computer-executable instructions, firmware, or combinations thereof. Computer-executable instruction or firmware implementations of the processor(s) 614 may include computer-executable or machine-executable instructions written in any suitable programming language to perform the various functions described.

The memory 612 may store program instructions that are loadable and executable on the processor(s) 614, as well as data generated during the execution of these programs. Depending on the configuration and type of user computing device, the memory 612 may be volatile (such as random access memory (RAM)) and/or non-volatile (such as read-only memory (ROM), flash memory, etc.). The computing device(s) 604 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 612 may include multiple different types of memory, such as static random access memory (SRAM), dynamic random access memory (DRAM), or ROM.

Turning to the contents of the memory 612 in more detail, the memory 612 may include an operating system 616, one or more data stores 615, and one or more application programs, modules, or services for implementing the features of the route planning engine 102 disclosed herein, provided via the application 606 (e.g., a browser application, a navigation application, etc.). The application 606 may be configured to receive, store, and/or display a network page or other interface for interacting with the service provider computer(s) 610. Additionally, the memory 612 and/or the data store 615 may be configured to store location information such as GPS coordinates and/or times associated with past route traversals. In some embodiments, the computing device(s) 604 may be configured to provide location information (e.g., in real time, from storage, etc.) to the service provider computer(s) 610 for further processing.

The computing device(s) 604 may also contain communications connection(s) 618 that allow the computing device(s) 604 to communicate with a stored database, another computing device or server (e.g., the service provider computer(s) 610), user terminals and/or other devices on the network(s) 608. The computing device(s) 604 may also include I/O device(s) 620, such as a keyboard, a mouse, a pen, a voice input device, a touch input device, a display, speakers, a printer, etc. Although not depicted, the computing device(s) 604 may include additional components such as a drive controller for controlling the movement of the computing device(s) 604. In these examples, the application 606 and/or another component of the computing device(s) may be configured to provide a suggested route to any suitable component of the computing device(s) 604 (e.g., a drive controller) in order to effectuate traversal of the suggested route by the computing device(s) 604. The application 606, or another component of the computing device(s) 604 (e.g., a drive controller) may be configured to identify computer-executable instructions for causing the computing device(s) 604 to traverse the suggested route.

In some aspects, the service provider computer(s) 610 may be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 610 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 610 may be in communication with the computing device(s) 604 and/or other service providers via the network(s) 608 or via other network connections. The service provider computer(s) 610 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 610 may include at least one memory 628 and one or more processing units (or processor(s)) 630. The processor(s) 630 may be implemented as appropriate in hardware, computer-executable instructions, firmware, or combinations thereof. Computer-executable instruction or firmware implementations of the processor(s) 630 may include computer-executable or machine-executable instructions written in any suitable programming language to perform the various functions described.

The memory 628 may store program instructions that are loadable and executable on the processor(s) 630, as well as data generated during the execution of these programs. Depending on the configuration and type of service provider computer(s) 610, the memory 628 may be volatile (such as RAM) and/or non-volatile (such as ROM, flash memory, etc.). The service provider computer(s) 610 or servers may also include additional storage 632, which may include removable storage and/or non-removable storage. The additional storage 632 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 628 may include multiple different types of memory, such as SRAM, DRAM, or ROM.

The memory 628, the additional storage 632, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 628 and the additional storage 632 are all examples of computer storage media. Additional types of computer storage media that may be present in the service provider computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 610. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 610 may also contain communications connection(s) 634 that allow the service provider computer(s) 610 to communicate with a stored database, another computing device (e.g., the computing device(s) 604) or server, user terminals and/or other devices on the network(s) 608. The service provider computer(s) 610 may also include I/O device(s) 636, such as a keyboard, a mouse, a pen, a voice input device, a touch input device, a display, speakers, a printer, etc.

Turning to the contents of the memory 628 in more detail, the memory 628 may include an operating system 640, one or more data stores 642, and/or one or more application programs, modules, or services for implementing the features disclosed herein, such as the features provided by the route planning engine 102.

Figure 7:
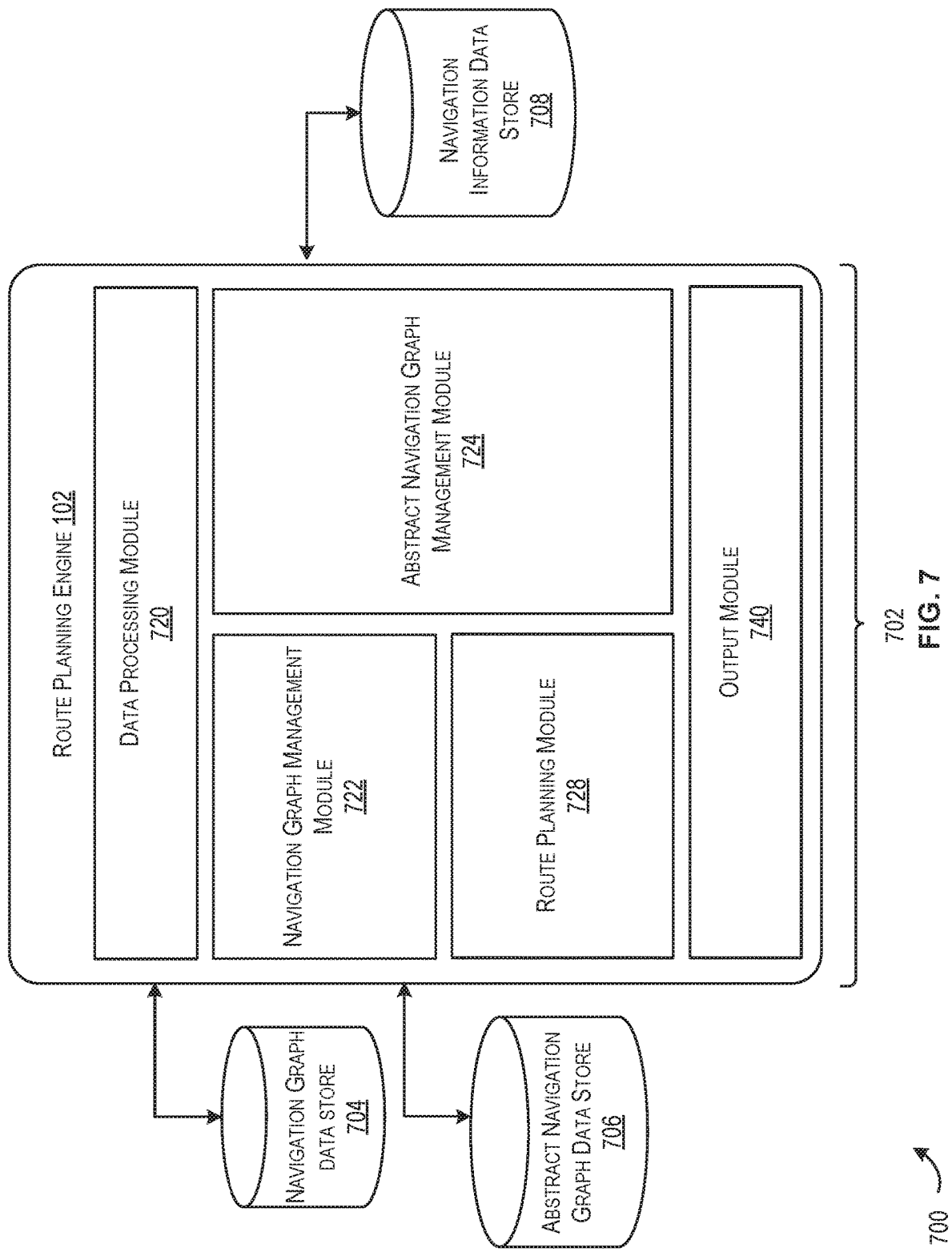
FIG. 7 is a schematic diagram of an example computer architecture for the route planning engine, including a plurality of modules that may perform functions in accordance with at least one embodiment.

FIG. 7 is a schematic diagram of an example computer architecture 700 for the route planning engine 102 of FIG. 1, including a plurality of modules 702 that may perform functions in accordance with at least one embodiment. The modules 702 may be software modules, hardware modules, or a combination thereof. If the modules 702 are software modules, the modules 702 can be embodied on a computer readable medium and processed by a processor in any of the computer systems described herein. It should be noted that any module or data store described herein, may be, in some embodiments, be a service responsible for managing data of the type required to make corresponding calculations. The modules 702 may be exist as part of the route planning engine 102 operating on the service provider computer(s) 610 of FIG. 6, or the modules may exist as separate modules or services external to the service provider computer(s) 610 (e.g., as part of the application 606 of FIG. 6 operating on the computing device(s) 604 of FIG. 6).

In the embodiment shown in the FIG. 7, a navigation graph data store 704, an abstract navigation graph data store 706, and a navigation information data store 708 are shown, although data can be maintained, derived, or otherwise accessed from various data stores, either remote or local to the route planning engine 102, to achieve the functions described herein. In at least one embodiment, the data stores described herein may be physically located on the computing device(s) 604 or alternatively, any suitable combination of the data stores may be operated as part of the service provider computer(s) 610, for example, as part of an route planning engine 102. The route planning engine 102, as shown in FIG. 7, includes various modules such as a data processing module 720, a navigation graph management module 722, an abstract navigation graph management module 724, a route planning module 728, and an output module 740. Some functions of the modules 702 are described below. However, for the benefit of the reader, a brief, non-limiting description of each of the modules is provided in the following paragraphs. In accordance with at least one embodiment, a process is identifying potential feature combinations for a new item.

In at least one embodiment, the route planning engine 102 includes the data processing module 720. Generally, the data processing module 720 may be utilized to receive any suitable information with respect to any example provided herein. The data processing module 720 may include any suitable number of application programming interfaces with which the functionality of the route planning engine 102 may be invoked.

For example, the data processing module 720 may be configured to one or more receive navigation graphs and/or navigation information from any suitable source. By way of example, the data processing module 720 may be configured to receive one or more navigation graphs from one or more commercial navigation graph providers. In some embodiments, the data processing module 720 may be configured to provide the received navigation graph(s) to the navigation graph management module 722 and/or to store the navigation graph within the navigation graph data store 704. The data processing module 720 may further be configured to receive navigation information (e.g., from one or more computing devices during or subsequent to performing one or more route traversals). The navigation information may include, for example, GPS data and corresponding attributes (e.g., time, date, weather conditions, traffic conditions, etc.). Over time, the data processing module 720 may receive new navigation information and may store such information within the navigation information data store 708 such that route planning and abstract navigation graph generation/maintenance may be conducted utilizing the new navigation information.

The data processing module 720 may further be configured to receive route requests (via application programming interfaces, via user interfaces provided by the route planning engine 102, etc.) from any suitable number of computing devices. The route requests may, in some embodiments, include at least a source location and a destination location. In some embodiments, the route request may further include weather conditions, traffic conditions, task assignment information (e.g., one or more identifiers and/or attributes for goods being transported by the requesting device), device capabilities (e.g., braking speed, turning radius, etc.) of the requesting device, or the like. Such route requests may be provided by any suitable computing device such as a component of a vehicle, a mobile drive unit, a user device (e.g., a smartphone, laptop, desktop, etc.). The data processing module 720 may provide at least part of the route request to another component of the route planning engine (e.g., the navigation graph management module 722 and/or the route planning module 728) to invoke functionality corresponding to the receiving component.

The navigation graph management module 722 may be configured to manage a number of navigation graphs contained within navigation graph data store 704. In some examples, the navigation graph management module 722 may be configured to receive a navigation graph and store the navigation graph within the navigation graph data store 704 such that the navigation graph is retrievable for subsequent route planning purposes. In some embodiments, the navigation graph management module 722 may identify and/or determine an area (e.g., a city, state, zip code, etc.) to which the navigation graph relates. The navigation graph management module 722 may maintain a mapping that indicates an association between an area (or an identifier of the area) with the related navigation map. In some embodiments, the navigation graph management module 722 may be configured to identify an area related to a source location and/or a destination location, retrieve, and provide a corresponding navigation graph to any component of the route planning engine 102 (e.g., the abstract navigation graph management module 724).

In some embodiments, the abstract navigation graph management module 724 may be configured to obtain (e.g., from the navigation graph management module 722 and/or directly from the navigation graph data store 704) a navigation graph (e.g., the navigation graph 108 of FIG. 1). The abstract navigation graph management module 724 may be configured to generate an abstract navigation graph utilizing the obtained navigation graph. As described above, the abstract navigation graph management module 724 may obtain edge data (defining one or more edges and corresponding edge attributes) and/or node data (e.g., defining one or more nodes and/or corresponding node attributes) from the navigation graph. At least a portion of the edge data and the node data may be included in the abstract navigation graph.

In some embodiments, the abstract navigation graph management module 724 may be configured to retrieve navigation information (e.g., GPS data indicating past traversals and associated attributes such as time, date, etc.) from the navigation information data store 708. By way of example, the abstract navigation graph management module 724 may utilize a time and/or date associated with the route request (e.g., a receipt time, a timestamp of the route request provided by the requesting device, etc.) to identify related navigation information from the navigation information data store 708. In some examples, the abstract navigation graph management module 724 may retrieve all historical location data corresponding to one or more edges of the navigation graph stored within the navigation information data store 708. In other embodiments, the abstract navigation graph management module 724 may request historical location data corresponding to one or more edges of the navigation which relate to the route request (e.g., historical location data that corresponds to a similar date and/or time). It should be appreciated that the route request may include, or additional information related to the route request such as current weather conditions, current and/or historical traffic conditions, and the like may be retrieved/provided from any suitable source such as weather forecast websites, traffic condition websites, the requesting computing device, and the like. As a non-limiting example, the requesting computing device (e.g., a component of a vehicle such as a car, a mobile drive unit, a truck, a smartphone, or the like) may be configured with any suitable number and type of sensors from which weather conditions (e.g., temperature, humidity, sunny/cloudy, etc.) and/or traffic conditions (e.g., congested traffic based on image capture, etc.) may be ascertained. The additional information may also be used to filter the historical location data retrieved from the navigation information data store 708 to location data that relates to the route request based on occurring during similar weather conditions, similar traffic conditions, and the like.

The abstract navigation graph management module 724 may be configured to generate and insert maneuver edges within the abstract navigation graph between edges obtained from the navigation graph retrieved from navigation graph data store 704. In some embodiments, the abstract navigation graph management module 724 may insert a maneuver edge between each adjacent pair of edges. In some embodiments, the abstract navigation graph management module 724 may selectively identify maneuver edge placement by identifying (e.g., from the historical location data) that a previous traversal from one edge to another has occurred. In this situation, the abstract navigation graph management module 724 may generate and insert a maneuver edge between the pair of adjacent edges that were previously traversed as indicated by the historical location data.

The abstract navigation graph management module 724 may be configured to identify traversal times for each edge of the abstract navigation graph and each maneuver edge of the navigation graph. In some embodiments, the abstract navigation graph management module 724 may default all of the maneuver edges to initially be assigned a traversal time of 0 (or another suitable default value). Utilizing the methods described above in connection with FIGS. 2-4, the abstract navigation graph management module 724 may identify speed profiles for one or more traversals of a given route. By way of example, the abstract navigation graph management module 724 may generate a speed profile identifying the speed of a single traversal over the given route (e.g., from node A, to node B, to node C of FIG. 2). For example, the abstract navigation graph management module 724 may utilize historic location data to identify traversal over a given route (e.g., from node A, to node B, to node C of FIG. 2). For each traversal, the abstract navigation graph management module 724 may calculate a speed between two points of the route. The abstract navigation graph management module 724 may average these speeds (either from a single traversal or from multiple traversals) to identify an average speed for each edge of the route. The abstract navigation graph management module 724 may save these speeds as a "speed profile." A speed profile may include average speeds of a single traversal or average speeds of multiple traversals.

It should be appreciated that the abstract navigation graph management module 724 may be configured to filter historic location data (e.g., positional data) based at least in part on a number of factors. By way of example, the abstract navigation graph management module 724 may filter any historic location data that does not pertain to a direction of travel corresponding to the direction of a particular maneuver edge for which a traversal time is ultimately being identified. Thus, historic location data over nodes A, B, and C, may be filtered based on the direction of travel for each traversals. Said another way, speed profiles may be determined utilizing historic location data in the direction of node A, to node B, to node C, while different speed profiles may be determined when traversals occurred in the direction of node C, to node B, to node A. The abstract navigation graph management module 724 may further identify historic location data depending on other factors. By way of example, if a route request is received that corresponds to a particular day, time, weather condition, traffic condition or the like, the abstract navigation graph management module 724 may filter out historic location data that doesn't correspond to those conditions (e.g., does not share any common attributes, or at least not common within a threshold amount). Thus, speed profiles may be determined utilizing historical location data that seemingly corresponds most heavily to the request at hand. By way of example, if the route request is issued on a Tuesday, in March, on a sunny day, when traffic appears to be light, the abstract navigation graph management module 724 may utilize historic location data that shares at least one common attribute with the route request (e.g., also on a Tuesday, also in March, also on a sunny day, also having light traffic conditions, or any suitable combination of the above).

In some embodiments, the abstract navigation graph management module 724 may apply a freshness rule when calculating traversal times for edges and/or maneuver edges. In some embodiments, historic location data (e.g., positional data) that is stale over a threshold time period (e.g., data that is 5 years old, 30 days old, when the threshold time period is 2 weeks) may be weighted less than historic location data that is more recent (e.g., 5 days old when the threshold time period is 2 weeks). In some embodiments, historic location data that is over a staleness threshold (e.g., the same or different threshold as above) may be ignored entirely. Thus, the abstract navigation graph management module 724 may utilize the freshness threshold(s) to ensure that only more current historic location data is utilized and/or that more current data is weighted more heavily than older data.

In some embodiments, the abstract navigation graph management module 724 may default each maneuver edge to a particular default value (e.g., 0) initially. However, it should be appreciated that the maneuver edges may be assigned varying default values. In some examples, the abstract navigation graph management module 724 may utilize known information about other edges and/or maneuver edges to assign a default value. By way of example, a particular maneuver edge (maneuver edge A) having particular attributes related to surface material, incline/grade, speed limits, intersection configuration, or the like, may have previously been assigned a traversal time of 10 seconds. The abstract navigation graph management module 724 may utilize this information to set a default traversal time for another maneuver edge (e.g., maneuver edge B) for which historic location data is not available (or for which less historic location data is known). This assignment may occur based at least in part on the abstract navigation graph management module 724 identifying that maneuver edge B shares at least one common attribute with maneuver edge A (e.g., they both have the same surface material). Accordingly, the abstract navigation graph management module 724 may assign maneuver edge B a default traversal time of 10 seconds (or at least a time that is based at least in part on identifying that maneuver edge A's traversal time is 10 seconds).

In some embodiments, the abstract navigation graph management module 724 may utilize predetermined rules to identify default maneuver edge traversal times. By way of example, these rules may identify that making a left hand turn that crosses at least one lane of traffic may typically take longer to traverse than most right hand turns. In some embodiments, the default times may be preassigned to vary based on the type of maneuver. Accordingly, the abstract navigation graph management module 724 may assign a particular default value based on a predefined default time scheme and the maneuver to occur upon traversal of the maneuver edge (e.g., left hand turn, right hand turn, U-turn, left hand turn with stop sign, etc.). In some embodiments, the predefined default time scheme may vary based on the location/area associated with the navigation graph from which the abstract navigation graph is being generated. That is, the traffic laws in various countries may differ, and accordingly the default traversal times for particular maneuvers may also differ.

In a similar manner, the abstract navigation graph management module 724 may be configured to utilize calculated traversal times of maneuver edges for which historic location data was available to calculate traversal times for maneuver edges for which less (or no) historic location data is available. For example, once traversal times are established for a given set of maneuver edges, the abstract navigation graph management module 724 may be configured to conduct a pattern matching procedure to identify maneuver edges that share some commonality with those maneuver edges. By way of example, some maneuver edges may not have over a threshold amount of historic location data available from past traversals. Nevertheless, these maneuver edges may be assigned a traversal time corresponding to a traversal time associated with another maneuver edge having at least one similar attribute. For example, maneuver edge C may be assigned a traversal time in the manner discussed above, utilizing historical location data of past traversals. However, maneuver edge D may have no, or very little, historic location data. Based on determining that maneuver edge C and maneuver edge D share at least one common attribute, the abstract navigation graph management module 724 may assign maneuver edge D a similar traversal time as maneuver edge C. Similarly, the abstract navigation graph management module 724 may utilize any known features of any node, edge, and/or maneuver edge to assign and/or update any attribute and/or traversal time associated with another node, edge, or maneuver edge. Thus, historical location data and/or attributes of any node, edge, and/or maneuver edge may be utilized by the abstract navigation graph management module 724 to update any suitable number of node(s), edge(s), and/or maneuver edge(s) of the abstract navigation graph which share one or more common attributes.

In some embodiments, the abstract navigation graph management module 724 may identify that speed profiles may exist for overlapping edges. That is, the abstract navigation graph management module 724 can identify that one or more speed profiles exist for one route (e.g., node A, to node B, to node C of FIG. 2) and that the route at least partially overlaps with another route (e.g., node A, to node B, to node, D of FIG. 3) associated with one or more different speed profiles.

The abstract navigation graph management module 724 may be configured to perform a reconciliation process as described in FIG. 4 to identify traversal times for each edge as well as traversal times for each maneuver edge of the abstract navigation graph based at least in part on speed profiles that correspond to those edges (e.g., speed profiles that include speeds 210 and speeds 310 of FIGS. 2 and 3, respectively). The process described in FIG. 4 may be performed by the abstract navigation graph management module 724 any suitable number of times in order to evaluate and/or assign traversal times to each edge and/or each maneuver edge of the abstract navigation graph.

In some embodiments, the abstract navigation graph management module 724 may be configured to replace a set of edges (e.g., the edges 508 of FIG. 5) with a maneuver edge (e.g., the maneuver edge 510 of FIG. 5). As described above, the abstract navigation graph management module 724 may analyze any attribute of the navigation graph 108 and/or any images and/or videos of an area corresponding to a portion of the navigation graph to identify a set of edges relate (e.g., relate to a maneuver). In some embodiments, the abstract navigation graph management module 724 may replace the set of related edges with a maneuver edge when the image and/or video data suggests more than a threshold number of traversals of a route corresponding to the set of edges (e.g., a vehicle has traversed the route/performed the maneuver such as a U-turn over a threshold number of times). Once identified, the maneuver edges that replaced a set of related edges of the navigation graph may be utilized to identify traversal times for each maneuver edge in a similar manner as described above with inserted maneuver edges.

In some embodiments, the abstract navigation graph management module 724 may be configured to supplement attributes, labels, or any suitable data of the navigation graph as provided by the commercial map provider. By way of example, through image recognition techniques and/or analysis of positional data, the abstract navigation graph management module 724 can ascertain that one or more edges correspond to an intersection. Street signs, stop signs, traffic lights, or any suitable attribute of the edge/node can be identified by analyzing the historic location data (e.g., positional data such as GPS coordinates of past traversals) indicating traversals through the intersection and/or the corresponding traversal times associated with the maneuver edges. By way of example, although the commercial map provider may not include an annotation that identifies a node and/or edge as being associated with a traffic light, through the analysis conducted for identifying placement of a maneuver edges and/or calculating the traversal time for said maneuver edge, the abstract navigation graph management module 724 may determine (e.g., based a predetermined rules set) that the traversal route and/or the traversal time(s) may indicate a traffic light. Additionally, or alternatively, the abstract navigation graph management module 724 may identify, utilizing image processing techniques, that an image/video of the intersection includes a traffic light. Accordingly, the abstract navigation graph management module 724 may supplement the commercial map provider's annotations by including an annotation, attribute, association, or the like indicating that the edges of area 506 are associated with a traffic light. This is merely one example, it should be appreciated that any suitable attribute(s) of an edge and/or node of the abstract navigation graph may be identified using similar techniques.

The abstract navigation graph management module 724 may generate a new abstract navigation graph for each route request or, in some embodiments, the abstract navigation graph management module 724 may update a pre-exiting abstract navigation graph periodically, based on a predetermined schedule, based on new navigation information being available for at least some edges and/or routes pertaining to a preexisting navigation graph, at any suitable time, and/or based on any suitable stimulus.

According to some embodiments, the route planning module 728 may be configured to identify a number of candidate routes for traversing an abstract navigation graph from a source location to a destination location. In some embodiments, the route planning module 728 may generate the number of candidate routes utilizing any suitable route-planning algorithm. For example, the route planning module 728 may be configured to execute a route-planning algorithm to generate a number of potential routes and select an optimal route. In some embodiments, an optimal route may be determined based on a predetermined algorithm and/or criteria. As a non-limiting example, an optimal route may correspond to be a lowest-cost route, where the lowest-cost is determined based at least in part on any suitable number of criteria (e.g., overall travel times, overall distance to be traveled, expected energy expended, expected risk of damage to the vehicle and/or goods being transported by the vehicle, capabilities of the computing device requesting the route, etc.). By way of example a route-planning algorithm may be configured to determine that the lowest-cost route is one that provides the fastest traversal time. It should be appreciated that other attributes of a potential route may be utilized to determine a lowest-cost route such as any suitable combination of the criteria described above, including any suitable combination of: expected elevation changes, expected risk (e.g., risk of vehicle damage and/or damage to transported goods, risk of theft, etc.), type of transported goods, expected traversal distance, expected expended energy, and the like. Through utilization of the abstract navigation graph, the route planning engine may utilize the expected traversal times associated with the maneuver edges to select (e.g., based on a predetermined selection criteria) an optimal route (e.g., a route which minimizes and/or maximizes one or more criteria values such as distance traveled, risk, overall traversal time, etc.). Once selected, the route planning module 728 may be configured to provide information identifying the selected route to the output module 740 for further processing.

In some embodiments, the route planning module 728 may be configured to employ any suitable exploration/exploitation algorithm (e.g., a multi-armed bandit algorithm) to correct for bias in the abstract navigation graph. By way of example, as time go by, particular routes may be favored by the abstract navigation graph management module 724. In some examples, less historic location data may be available for lesser traveled routes. In order to 1) confirm that a particular route is, in fact, the least costly, or 2) identify a more optimal route, the route planning module 728 may cause a non-optimal (e.g., any route other than the optimal route, a route with an unknown traversal time, etc.) to be suggested. Accordingly, new historic location data may be obtained from the (potentially) non-optimal route traversal. In subsequent calculations, the new historic location data may be utilized by the abstract navigation graph management module 724 to update the traversal time associated with at least the (potentially) non-optimal route traversal.

The traversal time for the potentially non-optimal route traversal may also be utilized to update other similar routes as discussed above. It may be the case, that through these updates, the abstract navigation graph management module 724 is enabled to correct its bias by determining that the previously non-optimal route is less costly than the previously determined optimal route.

According to some embodiments, the output module 740 may be configured to provide one or more user interfaces with a route request may be initiated. In some embodiments, the one or more interfaces may be configured to enable a user to select and/or specify at least a particular source and/or destination location. Additional information such as weather conditions, and/or traffic conditions may be provided via the user interface. In some embodiments, the output module 740 may be configured to receive a suggested route from the route planning module 728 and may provide identification of the suggested route, machine instructions for traversing the suggested route, or any suitable data to present the suggested route at the computing device via a user interface, to identify the suggested route to the computing device, and/or to instruct the computing device to traverse the suggested route.

Figure 8:
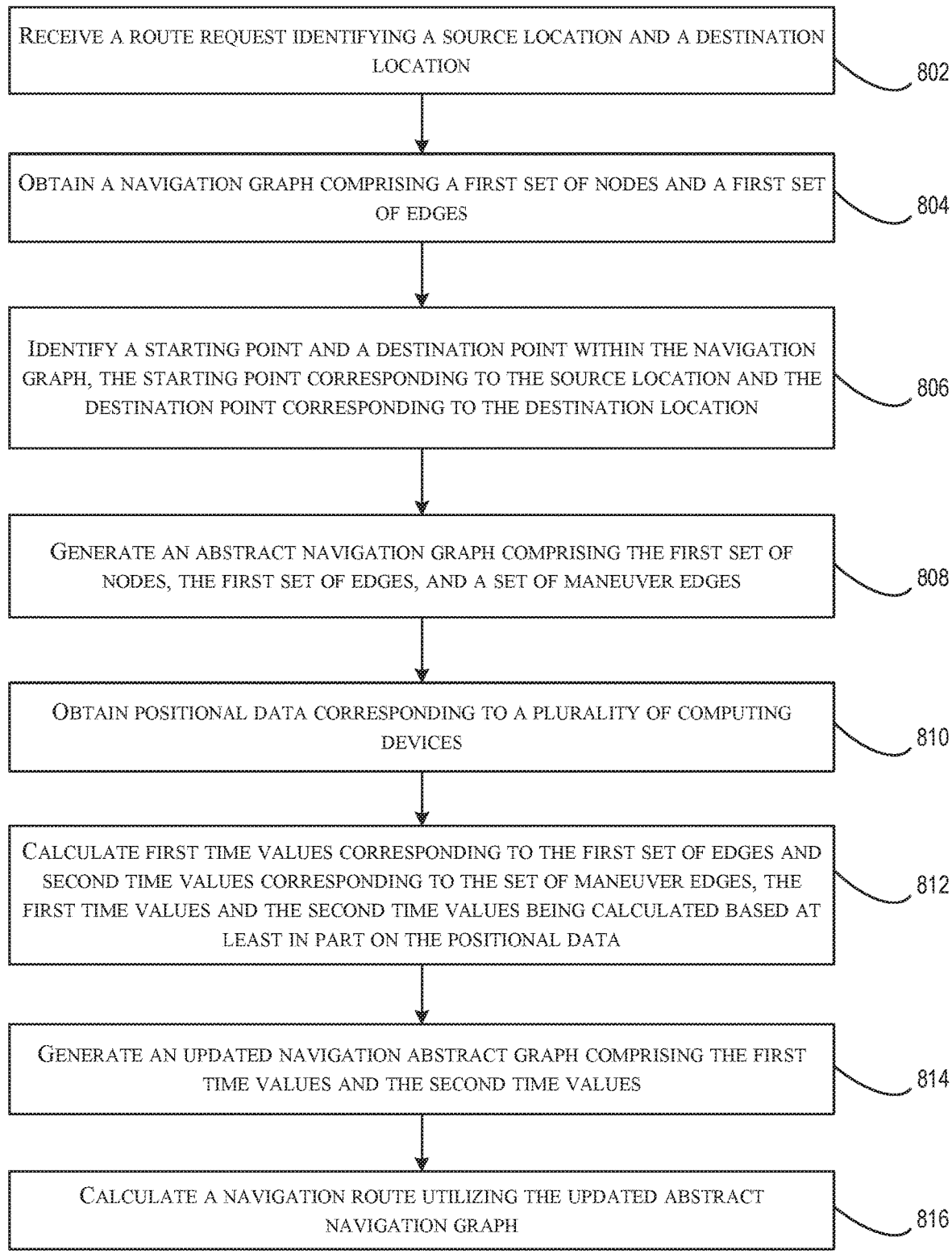
FIG. 8 is a flowchart illustrating an example method for calculating a navigation route utilizing an abstract navigation graph that includes a number of maneuver edges, in accordance with at least one embodiment.

FIG. 8 is a flowchart illustrating one further example method 800 for generating and utilizing an abstract navigation graph for route planning purposes, in accordance with at least one embodiment. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by a computing device (e.g., the computing device(s) 604 of FIG. 6 and/or the service provider computer(s) 610 of FIG. 6) at which at least a portion of the route planning engine 102 is executed. The computing device may include a processor and a memory storing computer-readable instructions that, upon execution by the processor, configure the computing device to perform the operations of the method 800.

The method 800 may begin at 802, where a route request is received (e.g., by the data processing module 720 of FIG. 7). In some embodiments, the route request identifies (at least) a source location and a destination location.

At 804, a navigation graph may be obtained by the computing device (e.g., by the navigation graph management module 722 from the navigation graph data store 704 of FIG. 7). The navigation graph may comprise a first set of nodes and a first set of edges. In some embodiments, the navigation graph management module 722 may obtain a navigation graph (potentially identified from many navigation graphs) corresponding to the route request (e.g., a navigation graph corresponding to a source location and/or destination location identified in the route request).

At 806, a starting point and a destination point within the navigation graph may be identified (e.g., by the navigation graph management module 722). In some embodiments, the starting point may correspond to the source location and the destination point may correspond to the destination location of the route request.

At 808, an abstract navigation graph may be generated (e.g., by the abstract navigation graph management module 724 of FIG. 7). The abstract navigation graph may comprise first set of nodes, the first set of edges, and a set of maneuver edges. The set of maneuver edges may be inserted between adjacent edges of the navigation graph and/or at least one maneuver edge may replace a set of related edges of the navigation graph. The insertion and/or replacement techniques are described above in more detail.

At 810, positional data (also referred to as historic location data) may be obtained (e.g., by the abstract navigation graph management module 724 from the navigation information data store 708 of FIG. 7). The positional data may correspond to a plurality of computing devices (e.g., a plurality of vehicles such as cars, trucks, mobile drive units, etc.).

At 812, first time values (e.g., traversal times) corresponding to the first set of edges and second time values corresponding to the set of maneuver edges may be calculated (e.g., by the abstract navigation graph management module 724). In some embodiments, the first time values and the second time values are calculated based at least in part on the positional data (as described above in connection with FIGS. 2-4).

At 814, an updated navigation abstract graph may be generated and/or modified (e.g., by the abstract navigation graph management module 724). The updated navigation graph may comprise the first time values and the second time values (e.g., traversal times for the edges of the original navigation graph/abstract navigation graph, and traversal times for the maneuver edges included in the abstract navigation graph).

At 816, a navigation route may be calculated (e.g., by the route planning module 728 of FIG. 7) utilizing the updated abstract navigation graph.

Figure 9:
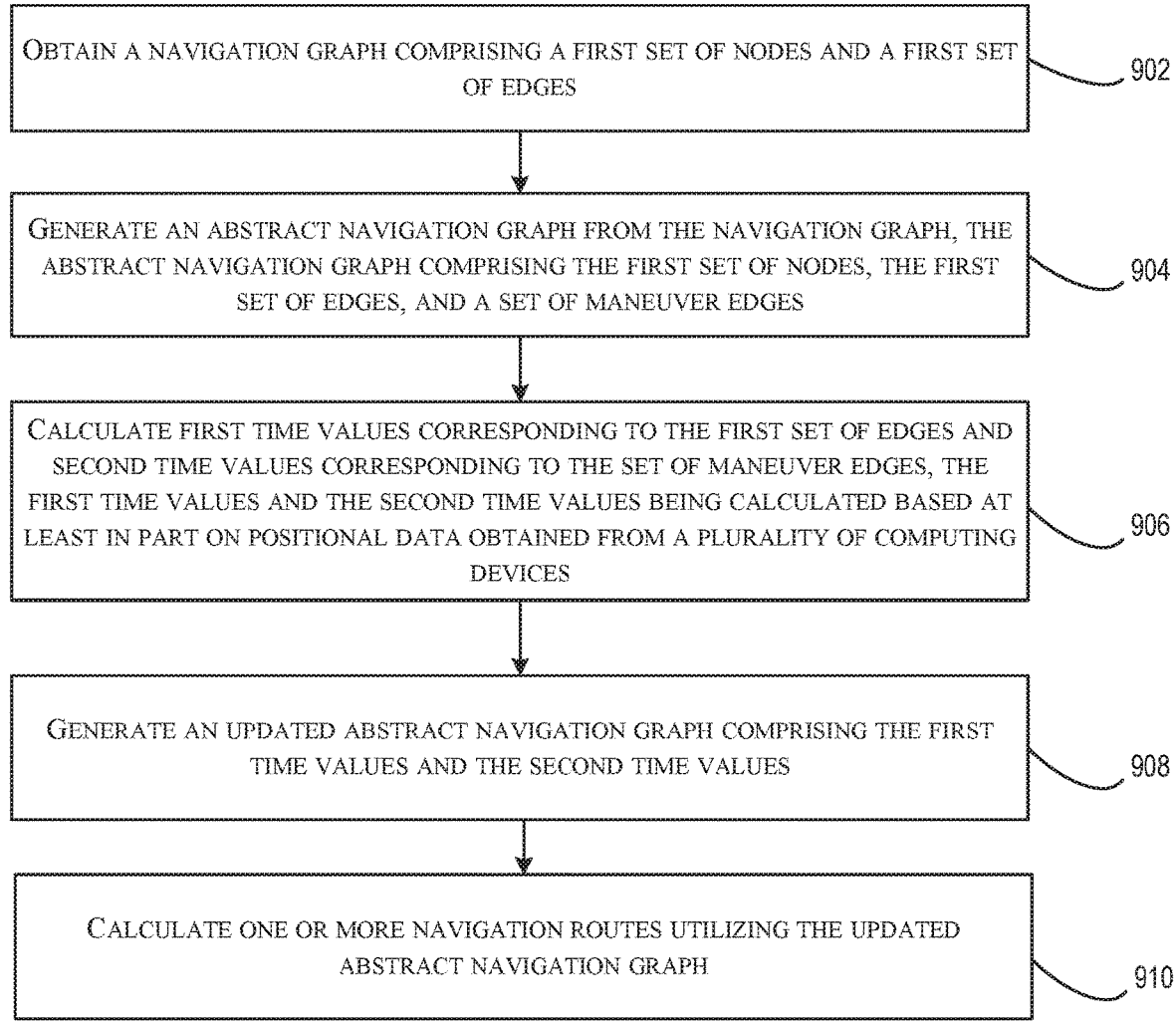
FIG. 9 is a flowchart illustrating another example method for calculating a navigation route utilizing an abstract navigation graph that includes a number of maneuver edges, in accordance with at least one embodiment.

FIG. 9 is a flowchart illustrating one further example method 900 for generating and utilizing an abstract navigation graph for route planning purposes, in accordance with at least one embodiment. It should be appreciated that the operations of the method 900 may be performed in any suitable, not necessarily the order depicted in FIG. 9. Further, the method 900 may include additional, or fewer operations than those depicted in FIG. 9. The operations of method 900 may be performed by a service provider computer (e.g., the service provider computer(s) 610 of FIG. 6), and/or one or more of computing device(s) (e.g., the computing device(s) 604 of FIG. 6), at which at least a portion of the route planning engine 102 is executed. The service provider computer and/or computing device (both referred to within FIG. 9 as a "computing device") may include a computer-readable storage medium having stored thereon computer-executable instructions that, when executed by a processor, cause the processor to perform the operations of the method 900.

The method 900 may begin at 902, where a navigation graph is obtained (e.g., by the navigation graph management module 722). The navigation graph may comprise a first set of nodes and a first set of edges.

At 904, an abstract navigation graph may be generated (e.g., by the abstract navigation graph management module 724) from the navigation graph. In some embodiments, the abstract navigation graph comprising the first set of nodes, the first set of edges, and a set of maneuver edges.

At 906, first time values corresponding to the first set of edges and second time values corresponding to the set of maneuver edges may be calculated (e.g., by the abstract navigation graph management module 724). In some embodiments, the first time values and the second time values are calculated based at least in part on positional data (also referred to herein as "location data" or "historical location data") obtained from a plurality of computing devices.

At 908, an updated abstract navigation graph may be generated (e.g., by the abstract navigation graph management module 724). The updated abstract navigation graph may comprise the first time values and the second time values.

At 910, one or more navigation routes may be calculated (e.g., by the route planning module 728 of FIG. 7) utilizing the updated abstract navigation graph.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   receiving, by a computing device, a route request identifying a source location and a destination location;
   obtaining, by the computing device, a navigation graph related to the route request, the navigation graph comprising a first set of nodes and a first set of edges;
   identifying, by the computing device, a starting point and a destination point within the navigation graph, the starting point corresponding to the source location and the destination point corresponding to the destination location;
   generating, by the computing device, an abstract navigation graph comprising the first set of nodes, the first set of edges, and a set of maneuver edges, a maneuver edge of the set of maneuver edges representing a traversal time for performing a maneuver between a pair of edges of the first set of edges;
   obtaining, by the computing device, positional data corresponding to historical route traversals by a plurality of computing devices;
   calculating, by the computing device, first time values corresponding to the first set of edges, a first time value being calculated based at least in part on a first subset of the positional data corresponding to first traversals from a first node to a second node utilizing a first edge of the first set of edges, the first node being connected to the second node within the abstract navigation graph via the first edge and a first maneuver edge;
   calculating, by the computing device, second time values corresponding to the set of maneuver edges, a second time value being calculated based at least in part on a second subset of the positional data corresponding to second traversals from the first node to a third node utilizing the first edge, the first node being connected to the third node within the abstract navigation graph via the first edge and a second maneuver edge;
   assigning, by the computing device, a minimum time value for the first edge based at least in part on identifying the minimum time value from the first time value and the second time value;
   assigning, by the computing device to the first maneuver edge, a difference value indicating a difference between the first time value and the second time value;
   generating, by the computing device, an updated navigation abstract graph comprising the first time values and the second time values; and
   calculating, by the computing device, a navigation route utilizing the updated abstract navigation graph.

2. The method of claim 1, wherein the first time values individually quantify a transit time between two nodes of the first set of nodes, wherein the first time values are calculated based at least in part on the positional data.

3. The method of claim 1, wherein individual maneuver are abstract zero-length edges that model a corresponding maneuver characterized by successive traversal of a pair of adjacent edges of the first set of edges.

4. The method of claim 1, further comprising:
   identifying, by the computing device, a subset of the positional data, the subset corresponding to a particular maneuver edge; and
   calculating, by the computing device, a time value quantifying a penalty for traversing the particular maneuver edge, the time value being calculated based at least in part on the positional data set corresponding to the particular maneuver edge.

5. A computing device, comprising:
   a processor; and
   a memory storing computer-readable instructions that, upon execution by the processor, configure the computing device to:
      obtain a navigation graph comprising a first set of nodes and a first set of edges;
      generate an abstract navigation graph from the navigation graph, the abstract navigation graph comprising the first set of nodes, the first set of edges, and a set of maneuver edges, a maneuver edge of the set of maneuver edges representing a traversal time for performing a maneuver between a pair of edges of the first set of edges;
      calculate first time values corresponding to the first set of edges and second time values corresponding to the set of maneuver edges based at least in part on positional data corresponding to historical route traversals by a plurality of computing devices, wherein calculating the first time values and the second time values causes the computing device to:
         calculate a first transit-time value based at least in part on a first subset of the positional data corresponding to first traversals from a first node to a second node utilizing a first edge of the first set of edges, the first node being connected to the second node within the abstract navigation graph via the first edge and a first maneuver edge;
         calculate a second transit-time value based at least in part on a second subset of the positional data corresponding to second traversals from the first node to a third node along the first edge, the first node being connected to the third node within the abstract navigation graph via the first edge and a second maneuver edge;
         assign a minimum transit-time value for the first edge based at least in part on identifying the minimum transit-time value from the first transit-time value and the second transit-time value; and
         assign, to the first maneuver edge, a difference value indicating a difference between the first transit-time value and the second transit-time value;
      generate an updated abstract navigation graph comprising the first time values and the second time values; and
      calculate one or more navigation routes utilizing the updated abstract navigation graph.

6. The computing device of claim 5, wherein calculating the second time values comprises additional instructions that configure the computing device to:
   identify, from the positional data, the first subset of the positional data corresponding to the first traversals from the first node to the second node utilizing the first edge of the first set of edges;
   identify, from the positional data, the second subset of the positional data, the second subset corresponding to the second traversals from the first node to the third node along the first edge; and calculate the difference value indicating the difference between the first transit-time value and the second transit-time value.

7. The computing device of claim 5, wherein the first edge of the first set of edges is associated with a set of attributes comprising at least one of: direction of travel, elevation change, surface type, temporal information, street/road name, traffic congestion, road sign(s), or street light(s), and wherein the first transit-time value and the second transit-time value are calculated further based at least in part on at least one of the set of attributes associated with the first edge.

8. The computing device of claim 6, wherein further instructions configure the computing device to:
receive, from an electronic device, a route request identifying a source location and a destination location, the electronic device having a set of device capabilities, wherein the first transit-time value and the second transit-time value are calculated further based at least in part on the set of device capabilities.

9. The computing device of claim 5, wherein the first subset of the positional data and second subset of positional data are each associated with a set of attributes comprising at least one of: a date or a time.

10. The computing device of claim 5, wherein calculating the first time values corresponding to the first set of edges causes the computing device to:
provide input to a statistical model, the input comprising at least one of a first set of attributes associated with the first edge and at least one of a second set of attributes associated at least one of the first subset of the positional data; and
receive output from the statistical model, the output comprising a transit-time value associated with the first edge.

11. The computing device of claim 5, wherein generating the abstract navigation graph from the navigation graph causes the computing device to:
identify, within the navigation graph, a placement location for the maneuver edge of the set of maneuver edges, the placement location being identified based at least in part on the positional data obtained from the plurality of computing devices, wherein the positional data indicates a number of traversals from the first edge of the first set of edges to a second edge of the first set of edges; and
insert the maneuver edge at the placement location of the navigation graph to generate the abstract navigation graph.

12. The computing device of claim 11, wherein the number of traversals exceeds a threshold value, and wherein the maneuver edge is inserted at the placement location based at least in part on the number of traversals exceeding the threshold value.

13. The computing device of claim 5, wherein further instructions configure the computing device to:
identify one or more edges of the first set of edges as being associated with a complex maneuver, the one or more edges being identified based at least in part on one or more attributes associated with the one or more edges; and
replace, within the abstract navigation graph, a portion of the one or more edges with the maneuver edge.

14. The computing device of claim 13, wherein the one or more attributes indicate an intersection associated with the one or more edges.

15. A computer-readable storage medium having stored thereon computer-executable instructions that, when executed by a processor, cause the processor to perform operations comprising:
obtaining a navigation graph comprising a first set of nodes and a first set of edges;
generating an abstract navigation graph from the navigation graph, the abstract navigation graph comprising the first set of nodes, the first set of edges, and a set of maneuver edges, a maneuver edge of the set of maneuver edges representing a traversal time for performing a maneuver between a pair of edges of the first set of edges;
calculating first time values corresponding to the first set of edges, a first time value being calculated based at least in part on a first subset of positional data corresponding to first traversals from a first node to a second node utilizing a first edge of the first set of edges, the first node being connected to the second node within the abstract navigation graph via the first edge and a first maneuver edge;
calculating second time values corresponding to the set of maneuver edges, a second time value being calculated based at least in part on a second subset of the positional data corresponding to second traversals from the first node to a third node utilizing the first edge, the first node being connected to the third node within the abstract navigation graph via the first edge and a second maneuver edge;
assigning a minimum time value for the first edge based at least in part on identifying the minimum time value from the first time value and the second time value;
assigning, to the first maneuver edge, a difference value indicating a difference between the first time value and the second time value;
generating an updated abstract graph comprising the first time values and the second time values; and
calculating one or more navigation routes utilizing the updated abstract graph.

16. The computer-readable storage medium of claim 15, wherein calculating the first time values comprises:
requesting the first time value for the first edge of the first set of edges from a statistical model configured with historical positional data indicating a plurality of traversals of the navigation graph; and
receiving, as output from the statistical model, the first time value for the first edge, wherein the first time value is determined by the statistical model based at least in part on the historical positional data and attributes of the first edge.

17. The computer-readable storage medium of claim 16, wherein calculating the second time values comprises:
requesting the second time value for the first maneuver edge corresponding to the first edge, the request being provided to the statistical model, and
receiving further output from the statistical model, the further output comprising the second time value for the maneuver edge, wherein the second time value is determined by the statistical model based at least in part on the historical positional data and the attributes of the first edge, wherein the second time value represents the difference value.

18. The computer-readable storage medium of claim 15, the processor performing further operations comprising:
receiving a route request identifying a source location and a destination location;

identifying, within the updated abstract navigation graph, a starting point from the source location and a destination point from the destination location;

calculating a minimum-cost traversal based at least in part on the updated abstract navigation graph, the starting point, and the destination point.

19. The computer-readable storage medium of claim 15, the processor performing further operations comprising:

identifying one or more of the first set of edges that correspond to a complex maneuver; and replacing, within the abstract navigation graph, the one or more of the first set of edges that correspond to the complex maneuver with the maneuver edge.

20. The computer-readable storage medium of claim 19, wherein a transit-time for the maneuver edge is calculated based at least in part on a subset of positional data corresponding to the one or more of the first set of edges that correspond to the complex maneuver.

\* \* \* \* \*